United States Patent
Black et al.

(10) Patent No.: US 10,430,018 B2
(45) Date of Patent: Oct. 1, 2019

(54) SYSTEMS AND METHODS FOR PROVIDING USER TAGGING OF CONTENT WITHIN A VIRTUAL SCENE

(71) Applicant: Sony Interactive Entertainment Inc., Tokyo (JP)

(72) Inventors: Glenn Black, San Mateo, CA (US); Jeffrey Roger Stafford, Redwood City, CA (US); Javier Fernandez Rico, Pacifica, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 117 days.

(21) Appl. No.: 15/603,292

(22) Filed: May 23, 2017

(65) Prior Publication Data

US 2017/0262154 A1    Sep. 14, 2017

Related U.S. Application Data

(63) Continuation-in-part of application No. 14/206,219, filed on Mar. 12, 2014, now Pat. No. 10,019,057, and
(Continued)

(51) Int. Cl.
*G06F 3/0484* (2013.01)
*G06F 3/0481* (2013.01)
(Continued)

(52) U.S. Cl.
CPC ........ *G06F 3/04815* (2013.01); *A63F 13/211* (2014.09); *A63F 13/212* (2014.09); *A63F 13/245* (2014.09); *A63F 13/26* (2014.09); *A63F 13/5255* (2014.09); *A63F 13/69* (2014.09); *G02B 27/0093* (2013.01); *G02B 27/017* (2013.01); *G06F 3/011* (2013.01); *G06F 3/012* (2013.01); *G06F 3/013* (2013.01); *G06F 3/017* (2013.01); *G06F 3/0304* (2013.01); *G06F 3/04842* (2013.01); *G06F 3/1454* (2013.01); *G06F 16/5866* (2019.01); *G06Q 30/0643* (2013.01); *G06T 19/003* (2013.01);
(Continued)

(58) Field of Classification Search
None
See application file for complete search history.

(56) References Cited

U.S. PATENT DOCUMENTS

2005/0021624 A1* 1/2005 Herf ................... H04L 12/1822
709/204
2012/0023166 A1* 1/2012 Kim ...................... H04W 4/043
709/204

(Continued)

*Primary Examiner* — Nhat Huy T Nguyen
(74) *Attorney, Agent, or Firm* — Penilla IP, APC

(57) ABSTRACT

Systems and methods for providing user tagging of content within a virtual scene are described. One of the methods includes sending data for display of a virtual environment on a head-mounted display. The virtual environment includes a virtual item. The method further includes receiving an indication of a selection associated with the virtual item. The method includes sending option data for allowing entry of content regarding the virtual item upon receiving the indication of the selection, receiving the content, associating the content with the virtual item, and sending tagged data for displaying a tag associated with the virtual item.

26 Claims, 15 Drawing Sheets

Related U.S. Application Data a continuation-in-part of application No. 14/658,123, filed on Mar. 13, 2015, now Pat. No. 9,710,057.

(60) Provisional application No. 62/357,342, filed on Jun. 30, 2016, provisional application No. 61/953,730, filed on Mar. 14, 2014, provisional application No. 61/832,758, filed on Jun. 7, 2013.

(51) Int. Cl.
| | | |
|---|---|---|
| *G02B 27/01* | (2006.01) | |
| *G06F 3/01* | (2006.01) | |
| *G06T 19/00* | (2011.01) | |
| *G06F 3/14* | (2006.01) | |
| *G06Q 30/06* | (2012.01) | |
| *G06F 16/58* | (2019.01) | |
| *G06F 3/03* | (2006.01) | |
| *G02B 27/00* | (2006.01) | |
| *A63F 13/26* | (2014.01) | |
| *A63F 13/211* | (2014.01) | |
| *A63F 13/245* | (2014.01) | |
| *A63F 13/5255* | (2014.01) | |
| *A63F 13/69* | (2014.01) | |
| *A63F 13/212* | (2014.01) | |
| *G06Q 50/12* | (2012.01) | |

(52) U.S. Cl.
CPC ...... *G06T 19/006* (2013.01); *G02B 2027/014* (2013.01); *G02B 2027/0138* (2013.01); *G02B 2027/0141* (2013.01); *G02B 2027/0187* (2013.01); *G06F 2203/04804* (2013.01); *G06Q 50/12* (2013.01); *G06T 2219/024* (2013.01)

(56) References Cited

U.S. PATENT DOCUMENTS

| | | | |
|---|---|---|---|
| 2012/0067954 A1* | 3/2012 | Moganti | H04N 5/232 235/451 |
| 2012/0290591 A1* | 11/2012 | Flynn | G06F 17/30247 707/754 |
| 2013/0293580 A1* | 11/2013 | Spivack | G06Q 30/0643 345/633 |
| 2014/0267408 A1* | 9/2014 | Mullins | G09G 5/377 345/633 |

* cited by examiner

SYSTEMS AND METHODS FOR PROVIDING USER TAGGING OF CONTENT WITHIN A VIRTUAL SCENE

CLAIM OF PRIORITY

This application claims the benefit of and priority, under 35 U.S.C. § 119(e), to U.S. Provisional Patent Application No. 62/357,342, filed on Jun. 30, 2016, and titled "SYSTEMS AND METHODS FOR PROVIDING USER TAGGING OF CONTENT WITHIN A VIRTUAL SCENE", which is hereby incorporated by reference in its entirety.

This application is a continuation-in-part of and claims the benefit of and priority, under 35 U.S.C. § 120, to U.S. patent application Ser. No. 14/206,219, filed on Mar. 12, 2014, and titled "SWITCHING MODE OF OPERATION IN A HEAD MOUNTED DISPLAY", which is hereby incorporated by reference in its entirety.

The U.S. patent application Ser. No. 14/206,219 claims the benefit of and priority, under 35 U.S.C. § 119(e), to U.S. Provisional Patent Application No. 61/832,758, filed on Jun. 7, 2013, and titled "SWITCHING MODE OF OPERATION IN A HEAD MOUNTED DISPLAY", which is hereby incorporated by reference in its entirety.

This application is a continuation-in-part of and claims the benefit of and priority, under 35 U.S.C. § 120, to U.S. patent application Ser. No. 14/658,123, filed on Mar. 13, 2015, and titled "METHODS AND SYSTEMS INCLUDING TRACKING HEAD MOUNTED DISPLAY (HMD) AND CALIBRATIONS FOR HMD HEADBAND ADJUSTMENTS," which is hereby incorporated by reference in its entirety.

The U.S. patent application Ser. No. 14/658,123 claims the benefit of and priority, under 35 U.S.C. § 119(e), to U.S. Provisional Patent Application No. 61/953,730, filed on Mar. 14, 2014, and titled "METHODS AND SYSTEMS TRACKING HEAD MOUNTED DISPLAY (HMD) AND CALIBRTATIONS FOR HMD HEADBAND ADJUSTMENTS", which is hereby incorporated by reference in its entirety.

FIELD

The present disclosure relates to systems and methods for providing user tagging of content within a virtual scene.

BACKGROUND

The video gaming industry is gaining traction. With the advancement of time, more people are playing video games using gadgets, e.g., controllers, cell phones, head-mounted displays, etc. To play the video games, information should be communicated.

It is within this context that embodiments described in the present disclosure arise.

SUMMARY

In some embodiments, methods for tagging virtual-reality content in shared spaces that are visited by different head-mounted display (HMD) users are described.

In various embodiments, tagging of content includes leaving recorded content or voice memos that are listened to by other HMD users when they approach the content or select the tag.

In several embodiments, a tag includes dropping a virtual asset into a virtual-reality scene, and providing a record of the different HMD users that interact with that dropped virtual asset.

In some embodiments, virtual tags are created using voice commands. The voice commands allow users to request specific types of content to find in specific virtual-reality environments.

In various embodiments, some tags in a virtual reality environment are obtained dynamically by a system, and categorized so that other virtual-reality users can find that content and add to the tag or comment regarding the tag. The more content is interacted with in the virtual environment, the more that content is categorized, identified, and recalled by other HMD users.

In some embodiments, certain content in a virtual-reality environment is elevated to more interesting than other content. Certain content is proposed to new HMD users entering the virtual-reality environment. As content becomes more popular, the content is pushed to other HMD users as they enter the virtual-reality environment.

Still further, in various embodiments, virtual-reality tag content is filtered so that certain types of content are presented to specific users based on their preferences. In this manner, content is screened for younger users, or content that is not desired or interesting to each specific HMD user is filtered out.

In one embodiment, a method for tagging a virtual item within a virtual environment is described. The method includes sending, via a computer network, virtual environment data for display of a first virtual environment on a first head-mounted display. The first head-mounted display is worn by a first user. The first virtual environment includes a virtual item. The method includes receiving, via the computer network and a first user account of the first user, an indication of a selection associated with the virtual item. The method further includes sending, via the computer network, option data for allowing entry of content regarding the virtual item upon receiving the indication of the selection. The method includes receiving, via the computer network, the content. The method further includes associating the content with the virtual item and the user account. The method includes sending, via the computer network, tagged data for displaying a tag associated with the virtual item. The tag indicates that the content is associated with the virtual item.

In an embodiment, a system for tagging a virtual item within a virtual environment is described. The system includes a first head-mounted display, which is worn by a first user. The system includes one or more servers coupled to the first head-mounted display via a computer network. The one or more servers send, via the computer network, virtual environment data for display of a first virtual environment on the first head-mounted display. The first head-mounted display displays the first virtual environment. The one or more servers receive, via the computer network and a first user account of the first user, an indication of a selection associated with the virtual item displayed on the first head-mounted display. The one or more servers further send, via the computer network, option data for allowing entry of content regarding the virtual item upon receiving the indication of the selection. The first head-mounted display displays the option data for the entry of the content. The one or more servers further receive, via the computer network, the content and associate the content with the virtual item. The one or more servers send, via the computer network, tagged data for displaying a tag associated with the virtual item. The tag indicates that the content is associated with the virtual item. The first head-mounted display displays the tag.

In an embodiment, a system for tagging a virtual item within a virtual environment is described. The system includes a head-mounted display that displays a first virtual environment. The head-mounted display is worn by a first user. The first virtual environment includes a virtual item. The system further includes a communication device coupled to the head-mounted display for sending, via a computer network and a first user account of the first user, an indication of a selection associated with the virtual item. The communication device receives, via the computer network, option data for allowing entry of content regarding the virtual item after the indication of the selection is sent. The head-mounted display displays the content. The communication device sends the content via the computer network to a server for associating of the content with the virtual item. The communication device receives tag data for displaying a tag associated with the virtual item. The tag indicates that the content is associated with the virtual item.

Some advantages of the herein described systems and methods include communicating information, e.g., content, etc., between various users. The communication of information helps the users in making a better determination whether to buy a real item represented by a virtual item, which is associated with a tag and a comment. Moreover, the communication is asynchronous, e.g., when one or both users are not logged into their corresponding accounts, or synchronous, e.g., when both users are logged into their corresponding accounts, etc.

Further advantages of the herein described systems and methods include providing a three-dimensional virtual environment in which three-dimensional virtual items are associated with content. A real user provides inputs via hand gestures or via a hand-held controller to change a perspective with which the three-dimensional virtual items are displayed within an HMD. The real user feels as if he/she is in the three-dimensional virtual environment. The real user provides a comment upon viewing the three-dimensional virtual item and a tag is generated to indicate that the three-dimensional virtual item is associated with the comment. When another real user visits the three-dimensional virtual environment again, the other real user manipulates the HMD to change a perspective of the three-dimensional virtual item. The other real user selects the tag or the three-dimensional virtual item to view the comment to determine whether to purchase a real item represented by the three-dimensional virtual item and/or whether to make further comments on the three-dimensional virtual item. The display of the comment and/or the tag with the three-dimensional virtual item provides a way to present information on the HMD so that there is no confusion to the other real user that the three-dimensional virtual item represents the same real item. This is in comparison to a case where different views of an item are displayed and different reviews are provided on the item by different users. Some users are confused whether the views are provided for the same item or to different items, represented by the different views.

Additional advantages of the herein described systems and methods include dynamically linking a virtual item to a three-dimensional model to allow a real user to ascertain that the virtual item represents a single real item. For example, when the real user views a two-dimensional view, e.g., a flat floor, a flat closed door, a flat window, etc., of a virtual item in a virtual environment on a head-mounted display, the user selects the virtual item and provides content to associate with the virtual item. When the content is associated with the virtual item, a tag is displayed besides the virtual item. When the virtual item or the tag is accessed by another real user on a head-mounted display, a processor generates a three-dimensional view of the virtual item based on an orientation of a face of the other real user on which the head-mounted display is worn. The other real user provides additional content to associate with the same virtual item or views the content provided by the real user to determine whether to purchase a real item associated with the virtual item. There is no confusion that the virtual item that is associated with the comment, the additional comment, and the tag is the same.

DETAILED DESCRIPTION OF THE EMBODIMENTS

Figure 1:
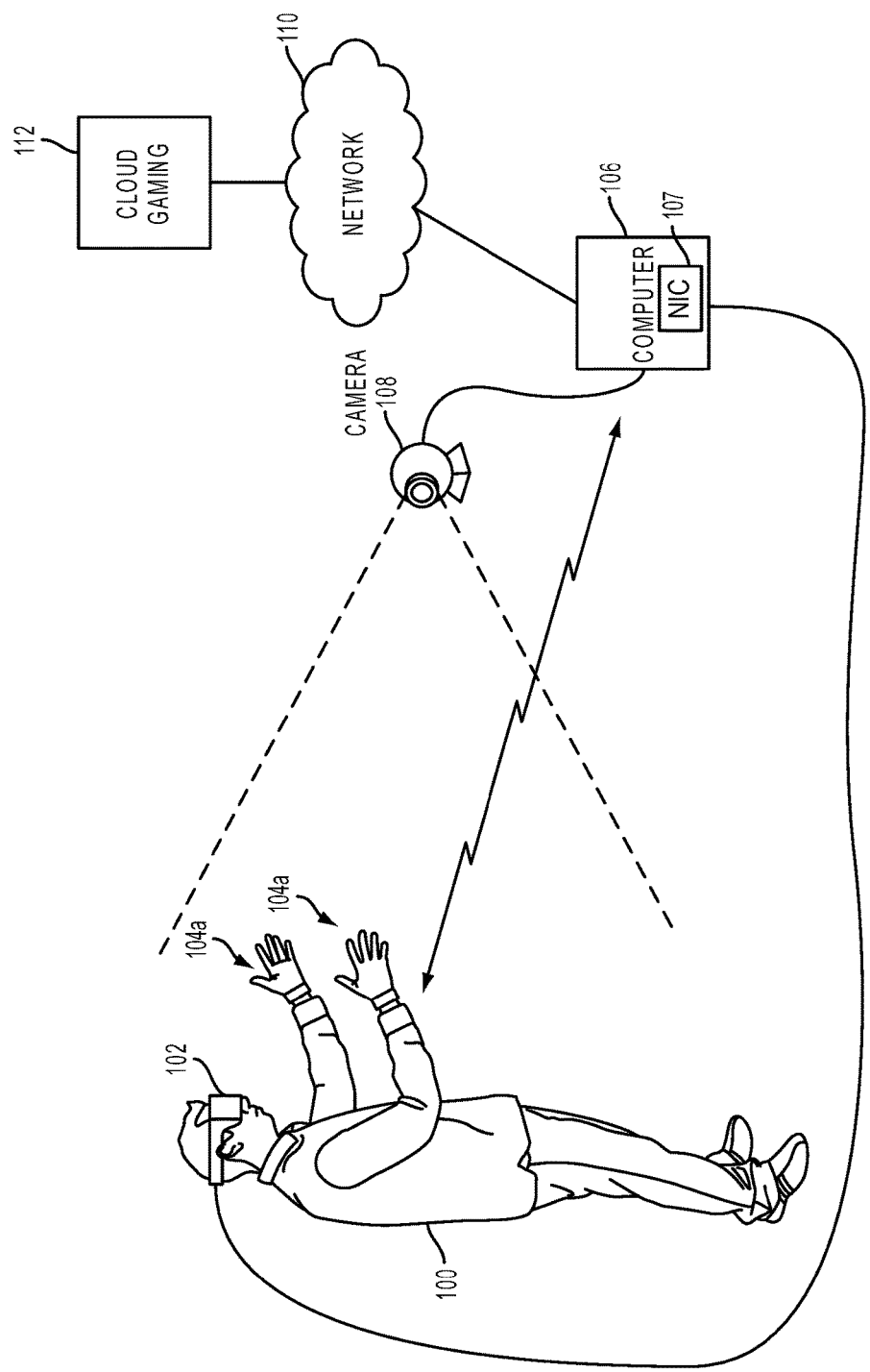
FIG. 1 illustrates a system for interactive gameplay of a video game, in accordance with an embodiment of the disclosure.

FIG. 1 illustrates a system for interactive gameplay of a video game, in accordance with an embodiment of the disclosure. A user 100 is shown wearing a head-mounted display (HMD) 102. The HMD 102 is worn in a manner similar to glasses, goggles, or a helmet, and is configured to display a virtual environment to the user 100. Examples of a virtual environment include a virtual reality scene or an augmented reality scene. The virtual environment is of a video game or a shopping platform, which users access to view virtual items to determine whether to purchase real items that are represented by the virtual items. In one embodiment, the shopping platform is a part of the video game.

The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user. An example of the HMD 102 is described in U.S. patent application Ser. No. 14/270,257, filed on May 5, 2014, titled "METHODS AND SYSTEMS FOR SOCIAL SHARING HEAD MOUNTED DISPLAY (HMD) CONTENT WITH A SECOND SCREEN", and published as U.S. Patent Application Publication No. 2015-0243078, which is hereby fully incorporated by reference herein in its entirety. Another example of the HMD 102 is described in U.S. patent application Ser. No. 14/296,379, filed on Jun. 4, 2014, titled "HEAD MOUNTED DISPLAY", and published as U.S. Patent Application Publication No. 2014-0361956, which is hereby fully incorporated by reference herein in its entirety.

In one embodiment, the HMD 102 is connected to a computer 106. The connection to computer 106 is wired or wireless. Examples of a wired connection, as used herein, include a parallel transfer connection, a serial transfer connection, and a universal serial bus (USB) connection. Examples of a wireless connection, as used herein, include a Bluetooth™ connection. The computer 106 is any general or special purpose computer known in the art, including but not limited to, a gaming console, personal computer, laptop, tablet computer, mobile device, cellular phone, tablet, thin client, set-top box, media streaming device, etc. In one embodiment, the computer 106 executes a video game, and outputs video and audio generated from the execution of the video game for rendering on one or more display screens of the HMD 102.

In some embodiments, the user 100 wears and operates one or two glove interface objects 104a to provide input for the video game. Additionally, a camera 108 captures images of a real-world interactive environment in which the user 100 is located. The camera 108 is defined to include one or more image capture devices, such as a stereoscopic pair of cameras, an infrared (IR) camera, a depth camera, or a combination thereof. In an embodiment, the camera 108 is located within the computer 106. Examples of the real-world interactive environment include an enclosed space, a room, a warehouse, and a floor of a building. These captured images are analyzed to determine a location and movements of the user 100, the HMD 102, and the glove interface objects 104a. In one embodiment, the glove interface object 104a includes a light which is tracked or markers that are tracked to determine its location and orientation.

As described below, a way the user 100 interfaces with the virtual environment displayed on the HMD 102 varies, and other interface devices in addition to glove interface objects 104a, are optionally used. For instance, single-handed controllers are used, as well as two-handed controllers. In some embodiments, the controllers are tracked themselves by tracking lights associated with the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual environment presented on the HMD 102.

Additionally, in some embodiments, the HMD 102 includes one or more lights which can be tracked to determine a location and orientation of the HMD 102. The HMD 102 includes one or more microphones to capture sound from the real-world interactive environment. In some embodiments, the microphones are separate from the HMD 102, e.g., integrated within the camera 108, etc. Sound captured by a microphone array is processed to identify a location of a sound source. Sound from an identified location is selectively utilized or processed to the exclusion of other sounds not from the identified location.

In another embodiment, the computer 106 functions as a thin client in communication over a computer network 110 with a cloud gaming provider 112. Examples of the computer network 110 include a local area network such as an Intranet, or a wide area network such as the Internet, or a combination thereof. The cloud gaming provider 112 is a server system that includes one or more servers for execution of the video game. In an embodiment, the cloud gaming provider 112 is a virtual machine. The cloud gaming provider 112 maintains and executes the video game being played by the user 102. The computer 106 transmits inputs from the HMD 102, the glove interface objects 104a, and/or the camera 108, to the cloud gaming provider 112, which processes the inputs to affect a game state of the video game. An output from the video game, such as video data, audio data, and haptic feedback data, is transmitted to the computer 106. The computer 106 further processes the output before transmission or directly transmits the output to relevant devices. For example, video and audio data streams are provided to the HMD 102, whereas a vibration feedback command is provided to the glove interface object 104a.

In one embodiment, the HMD 102, the glove interface object 104a, and the camera 108, are networked devices that connect to the computer network 110 to communicate with the cloud gaming provider 112. For example, the computer 106 is a local network device, such as a router, that does not otherwise perform video game processing, but which facilitates passage of network traffic. The connections between the computer network 110 and the HMD 102, glove interface object 104a, or the camera 108 are wired or wireless.

Additionally, though embodiments in the present disclosure are described with reference to a head-mounted display, it will be appreciated that in other embodiments, non-head mounted displays are used instead, including without limitation, a television, projector, liquid crystal display (LCD) display screen, portable device screen (e.g. tablet, smartphone, laptop, etc.) or any other type of display that render video and/or provide for display of the virtual environment in accordance with the present embodiments.

Figure 2A:
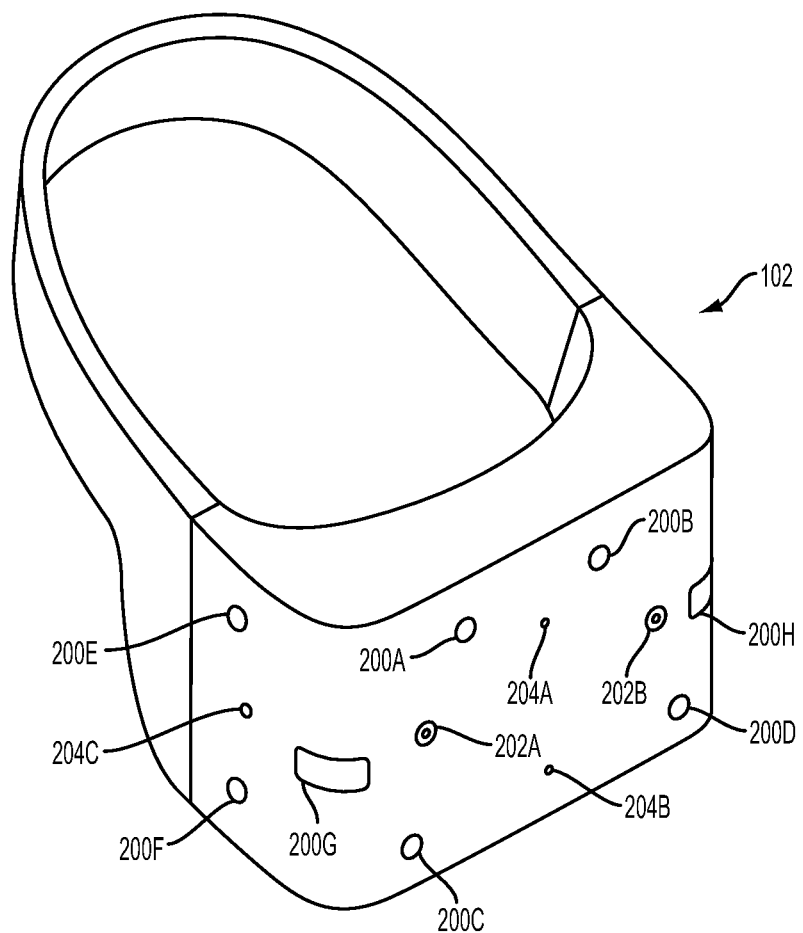
FIG. 2A illustrates a head-mounted display (HMD), in accordance with an embodiment of the disclosure.

FIG. 2A illustrates a head-mounted display (HMD), in accordance with an embodiment of the disclosure. As shown, the HMD 102 includes a plurality of lights 200A-H. Each of these lights 200A-H have specific shapes, and have the same or different colors. The lights 200A, 200B, 200C, and 200D are arranged on a front surface of the HMD 102. The lights 200E and 200F are arranged on a side surface of the HMD 102. And the lights 200G and 200H are arranged at corners of the HMD 102 to span the front surface and a side surface of the HMD 102. It will be appreciated that the lights are identified in captured images of an interactive environment in which a user uses the HMD 102. Based on identification and tracking of the lights, the location and orientation of the HMD 102 in the real-world interactive environment is determined. It will further be appreciated that some of the lights are or are not visible depending upon the particular orientation of the HMD 102 relative to the camera 108 of FIG. 1. Also, different portions of lights (e.g. lights 200G and 200H) are exposed for image capture depending upon the orientation of the HMD 102 relative to the camera 108.

In one embodiment, the lights indicate a current status of the HMD 102 to other users in the real-world interactive environment. For example, some or all of the lights 200A-H have a certain color arrangement, intensity arrangement, blink, have a certain on/off configuration, or have another arrangement indicating a current status of the HMD 102. By way of example, the lights 200A-H display different configurations during active gameplay of the video game versus other non-active gameplay aspects of the video game, such as navigating menu interfaces or configuring game settings, during which a gameplay virtual scene may be inactive or paused. The lights 200A-H indicate relative intensity levels of gameplay. For example, an intensity of the lights 200A-H or a rate of blinking of the lights 200A-H increase when the intensity of the gameplay increases. In this manner, a person standing near the user views one or more of the lights 200A-H on the HMD 102 and understands that the user is actively engaged in intense gameplay, and may not wish to be disturbed at that moment.

The HMD 102 additionally includes one or more microphones. In the illustrated embodiment, the HMD 102 includes microphones 204A and 204B defined on the front surface of the HMD 102, and microphone 204C defined on a side surface of the HMD 102. By utilizing an array of microphones, sound from each of the microphones is processed by the computer 106 or the cloud gaming provider 112 to determine a location of the sound's source. The location of the sound's source is utilized in various ways, including exclusion of unwanted sound sources, association of a sound source with a visual identification, etc.

Figure 3:
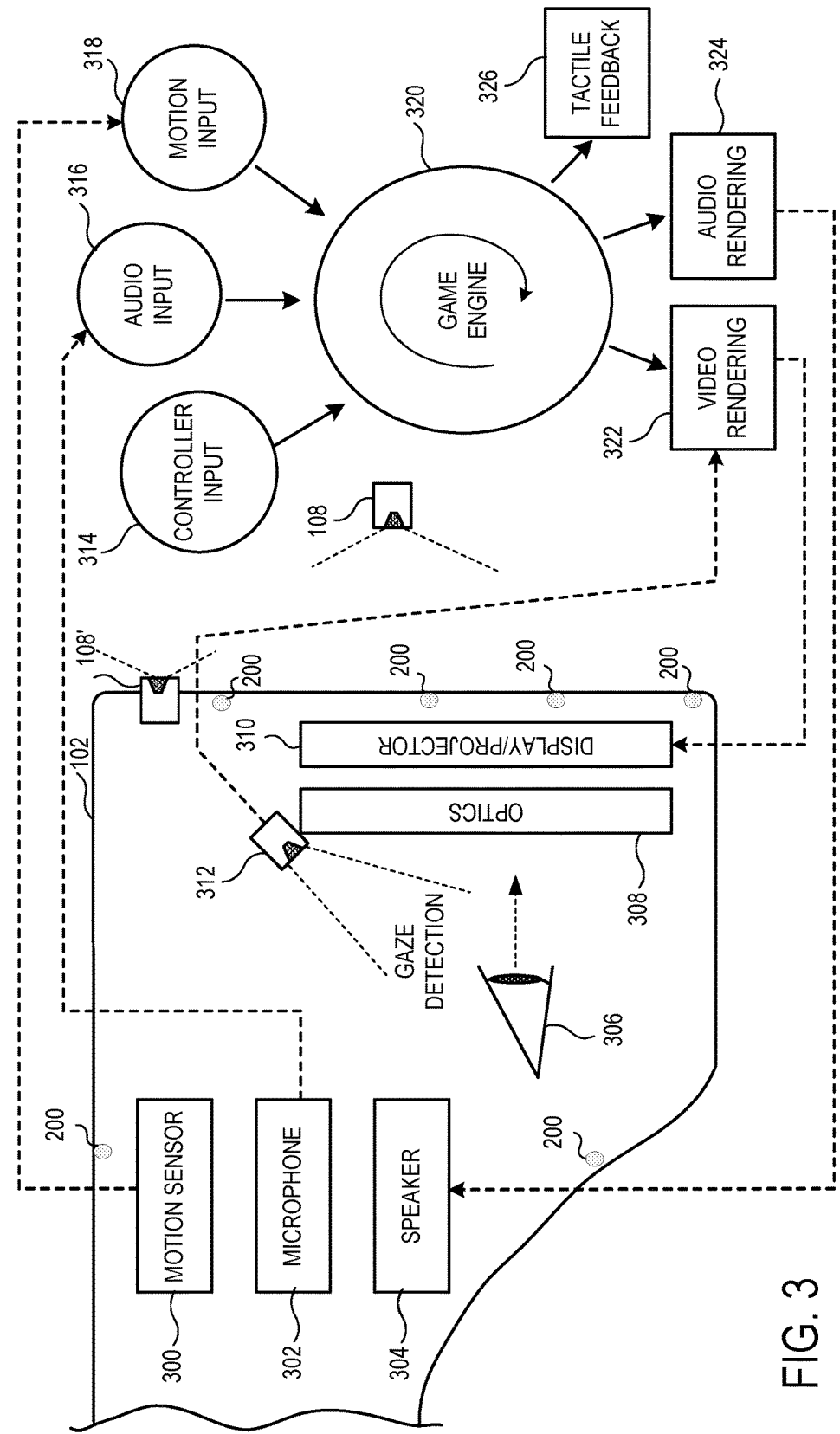
FIG. 3 conceptually illustrates the function of an HMD in conjunction with an execution of a video game, in accordance with an embodiment of the disclosure.

The HMD 102 includes one or more image capture devices. In the illustrated embodiment, the HMD 102 is shown to include image capture devices 202A and 202B. By utilizing a stereoscopic pair of image capture devices, three-dimensional (3D) images and video of the real-world interactive environment are captured from a perspective of the HMD 102. Such video is presented to the user to provide the user with a "video see-through" ability while wearing the HMD 102. That is, though the user cannot see through the HMD 102 in a strict sense, the video captured by the image capture devices 202A and 202B (e.g., or one or more front facing cameras 108' disposed on the outside body of the HMD 102, as shown in FIG. 3 below) nonetheless provide a functional equivalent of being able to see the real-world interactive environment external to the HMD 102 as if looking through the HMD 102. Such video is augmented with virtual items to provide an augmented reality experience, or is combined or blended with the virtual items in other ways. Though in the illustrated embodiment, two cameras are shown on the front surface of the HMD 102, it will be appreciated that there may be any number of externally facing cameras installed on the HMD 102, oriented in any direction. For example, in another embodiment, there are cameras mounted on the sides of the HMD 102 to provide additional panoramic image capture of the environment.

Figure 2B:
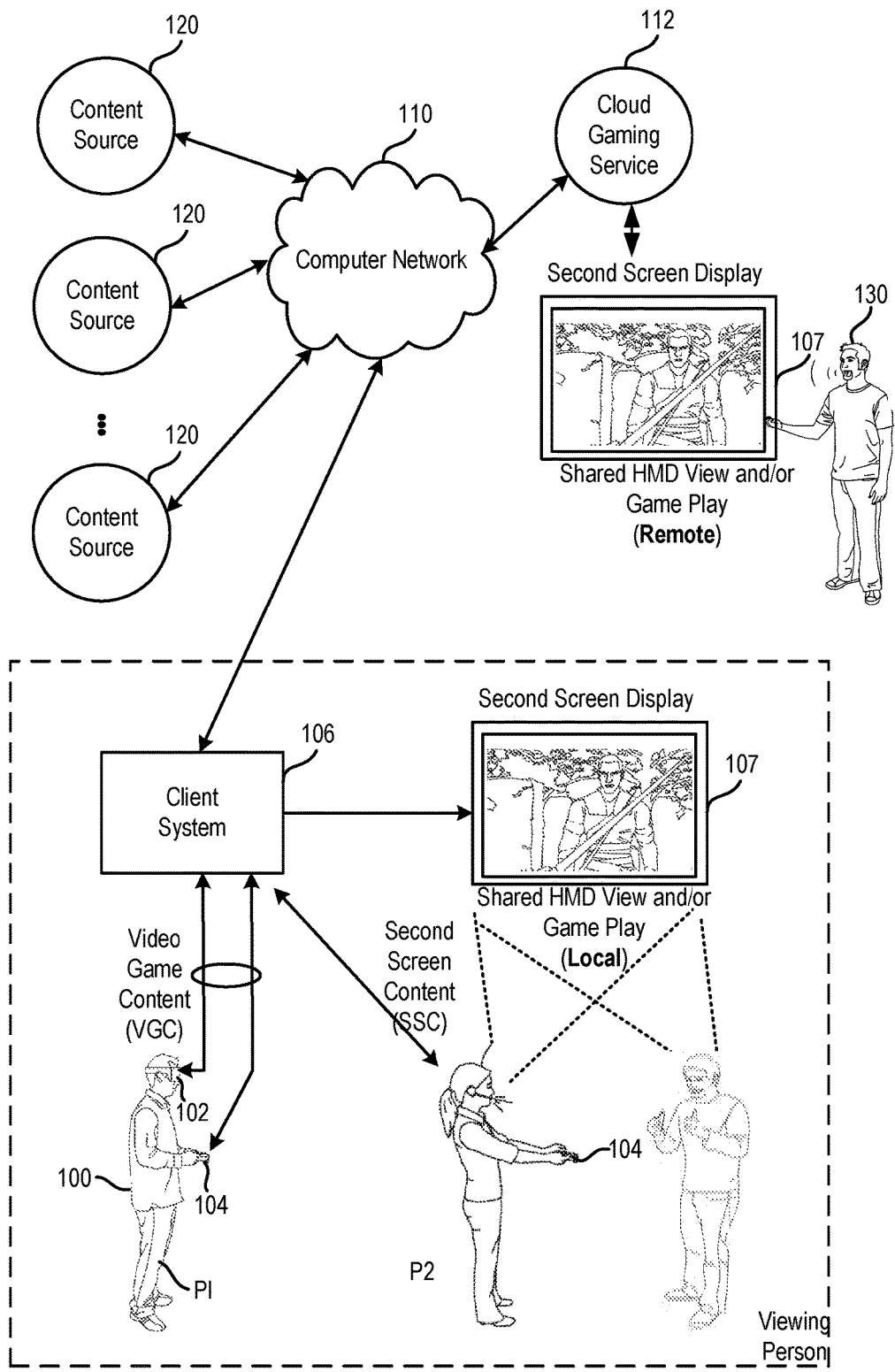
FIG. 2B illustrates one example of an HMD user interfacing with a client system, and the client system providing content to a second screen display, which is referred to as a second screen, in accordance with one embodiment.

FIG. 2B illustrates one example of an HMD 102 interfacing with the computer 106, and the computer 106 providing content to a second screen display. The second screen display is referred to herein as a second screen 107. As will be described below, the computer 106 includes integrated electronics for processing the sharing of content from the HMD 102 to the second screen 107. Other embodiments include a separate device, module, connector, that will interface between the computer 106 and each of the HMD 102 and the second screen 107. In this general example, the user 100 is wearing the HMD 102 and is playing a video game using a hand-held controller 104. The interactive play by the user 100 will produce video game content (VGC), which is displayed interactively to the HMD 102.

In one embodiment, the content being displayed on the HMD 102 is shared to the second screen 107. In one example, a person viewing the second screen 107 views the content being played interactively in the HMD 102 by the user 100. In another embodiment, another user (e.g. player 2) interacts with the computer 106 to produce second screen content (SSC). The SSC is produced when the player 2 also interacts with the controller 104 (or any type of user interface, gesture, voice, or input. The SSC is displayed on the second screen 107 along with the VGC received from the HMD 102.

Accordingly, the interactivity by other users who are co-located or remote from an HMD user is social, interactive, and more immersive to both the HMD user and the other users who are viewing the content played by the HMD user on the second screen 107. A user who is remote the HMD user 100 is labeled as 130. As illustrated, the computer 106 is connected to the computer network 110. The computer network 110 also provides access to the computer 106 to content from various content sources 120. The content sources 120 includes any type of content that is accessible over the computer network 110.

Such content, without limitation, includes video content, movie content, streaming content, social media content, news content, encoded streaming content, friend content, advertisement content, etc. In one embodiment, the computer 106 is used to simultaneously process content for an HMD user, such that the HMD 102 is provided with multimedia content associated with interactivity of the user 100 during gameplay. The computer 106 also provides other content, which may be unrelated to the video game content, to the second screen. The computer 106, in one embodiment, receives the second screen content from one of the content sources 120, or from a local user, or a remote user.

FIG. 3 conceptually illustrates a functionality of the HMD 102 in conjunction with the video game, in accordance with an embodiment of the disclosure. The video game is defined by a game engine 320 which receives inputs to update a game state of the video game. The game state of the video game is defined, at least in part, by inputs received from gestures or voice commands of the user 100. The inputs are captured by the camera 108, the HMD 102, and/or by sensors, such as accelerometers and gyroscopes. The sensors are integrated within the HMD 102 or within glove interface objects 104a or within hand-held controllers. Examples of the game state include various aspects of the current gameplay, such as the presence and location of the virtual objects, conditions of the virtual environment, triggering of events, user profiles, and view perspectives, etc.

In the illustrated embodiment, the game engine 320 receives, by way of example, controller input 314, audio input 316 and motion input 318. The controller input 314 is defined from the operation of a gaming controller separate from the HMD 102, such as the handheld controller (e.g. Sony DUALSHOCK®4 wireless controller, Sony PlayStation®Move motion controller) or the glove interface object 104a. By way of example, the controller input 314 includes directional inputs, button presses, trigger activation, movements, gestures, or other kinds of inputs processed from the operation of the gaming controller. The audio input 316 is received by the game engine 320 from a sound of the user 100 that is captured by a microphone 302 of the HMD 102, or from a microphone included in the image capture device 108, or elsewhere in the real-world interactive environment. Each of the microphones 204A through 204C is an example of the microphone 302. The motion input 318 is received by the game engine 320 from a motion sensor 300 included in the HMD 102 and/or from the camera 108 as it captures images of the HMD 102. The game engine 320 receives the inputs, e.g., the controller input 314, the audio input 316 and the motion input 318, etc., and processes the inputs according to a configuration of the game engine 320 to update the game state of the video game. The game engine 320 outputs game state data to various rendering modules which process the game state data to define content which will be presented to the user 100 or to another user via another HMD. Examples of the content include video content and audio content.

In the illustrated embodiment, a video rendering module 322 is defined to render a video stream for presentation on the HMD 102 based on the game state data. The video stream is presented by a display/projector mechanism 310, and viewed through optics 308, such as one or more lenses, by an eye 306 of the user 100. An audio rendering module 304 renders an audio stream for listening by a user. In one embodiment, the audio stream is output through a speaker 304 associated with the HMD 102. It should be appreciated that speaker 304 takes the form of an open air speaker, headphones, or any other kind of speaker capable of presenting audio.

In an embodiment, the sound that is captured as the audio input 316 is stored in a memory device of the computer 106 or of the cloud gaming service 112 in the form of audio data. As used herein, a memory device is a read-only memory device (ROM), or a random access memory (RAM), or a combination thereof. The audio data is accessed from the computer 106 or of the cloud gaming service 112 to be output as the audio stream on an HMD, which is other than the HMD 102.

In one embodiment, a gaze tracking camera 312 is included in the HMD 102 to enable tracking of a gaze of the user 100. The gaze is an example of a gesture performed by the user 100. The gaze tracking camera captures images of eyes of the user 100. The images are analyzed to determine a gaze direction of the user 100. In one embodiment, information about the gaze direction of the user 100 is utilized to affect the video rendering. For example, if the eyes of the user 100 are determined to be looking in a specific direction, then the video rendering for that direction is prioritized or emphasized, such as by providing greater detail or faster updates in the region where the user 100 is looking. It should be appreciated that the gaze direction of the user 100 is defined relative to the HMD 102, relative to the real-world interactive environment in which the user 100 is situated, and/or relative to the virtual environment that is being rendered on the HMD 102.

Additionally, a tactile feedback module 326 provides signals to tactile feedback hardware included in either the HMD 102 or another device operated by the user 100, such as the hand-held controller 104. The tactile feedback module 326 takes the form of various kinds of tactile sensations, such as vibration feedback, temperature feedback, pressure feedback, etc.

At present, streaming services for sharing game replays are very popular. The DualShock®4 wireless controller includes a "share button" directly on the controller to enable such sharing. Implementations of the present disclosure improve sharing replays for people who wish to explore replays using an HMD. Implementations of the present disclosure provide for rendering of a game replay with a very wide field of view to allow a spectator to move his head freely using the HMD 102 and view the replay from novel vantage points. The traditional streaming approach would limit the replay to only what the original player viewed, so that the view direction would be independent of the spectator's head position and orientation, and if the spectator using the HMD 102 moved his head, nothing would change.

Implementations of the disclosure provide for the rendering of videos in a wide enough field of view to support novel viewpoints in the HMD 102. A custom build of a game engine that runs on a cloud server (e.g. on console gaming hardware, e.g. PlayStation®4 hardware, in the cloud), that accepts as input game state streamed from the original player's game engine and uses it to render an extremely wide field of view (e.g. 150 degree plus) view of the game, that is then used for real-time streaming and/or pre-recorded playback of that game session. It will be appreciated that the extremely wide field of view is in excess of the HMD 102's field of view, allowing for the spectator wearing the HMD 102 to look around in the replay. The actual game is configured to stream its state to the networked version of the engine.

As described above, there is a need to provide users the ability to spectate, e.g., watch the interactive activity being experienced by users wearing HMDs 102. For example, an HMD player is immersed in the activity presented in the HMD 102, while other persons are co-located with the player. These other co-located players find enjoyment in watching the interactivity experienced or virtual reality scene being viewed by the player via the HMD 102. As used herein, the HMD player is one that is viewing content presented on the HMD 102, or is one that is interacting with some content resented on the HMD 102, or is playing a game presented on the HMD 102. As such, reference to the HMD player, is made with reference to a user that is wearing the HMD 102, irrespective of the type of content being presented on the HMD 102.

In still other embodiments, other persons that are not co-located with the HMD player wish to view the content, interactivity, or media being presented in the HMD 102 worn by the HMD player. For instance, a website is provided to present users with the ability to select from different HMD players, so as to watch and spectate while the HMD player performs his or her activities. This example is similar to standard Twitch-type experiences, which allow users connected to the computer network 110 to access a website and search for different types of content or media being played by remote players. The remote players, in some embodiments, are playing games using an HMD, such as the HMD 102.

In other embodiments, the remote players are playing games or watching content using a display screen of a device or a television display screen. Broadly speaking, users wishing to watch the activity of the HMD player that is remote, e.g., over a website, select specific players or types of games, or thumbnails of the games, or thumbnails of the content, to view the activity being directed by the HMD player. Thus, a website is provided that enables users to view and select specific interactive content that may be actively played by the HMD player. The remote viewer wishing to view the activity by the HMD player, simply clicks on that content and begins watching.

The person watching and viewing the actions by the HMD player is generally referred to as a spectator. Spectators are those persons who are given access to view the activities, interactivities, actions, movements, etc., but are not necessarily controlling the game action. For this reason, these viewers are referred to as spectators. In the context of the HMD player, the content being presented on the display of the HMD 102 is dynamic and is controlled by the movements of the HMD player. For example, when the HMD player moves his or her head around, the HMD player is presented with different content that is viewable, similar to the way real world viewing of a person's surroundings can occur.

In one embodiment, each of the game engine 320, the video rendering module 322 and the audio rendering module 324 is hardware, such as an integrated circuit, or a computer software program, that is executed by one or more processors. In an embodiment, each of the game engine 320, the video rendering module 322 and the audio rendering module 324 is executed by one or more processors of the cloud gaming service 112 or of the computer 106. As used herein, a processor is an application specific integrated circuit (ASIC), or a programmable logic device (PLD), or a central processing unit (CPU).

Figure 4A:
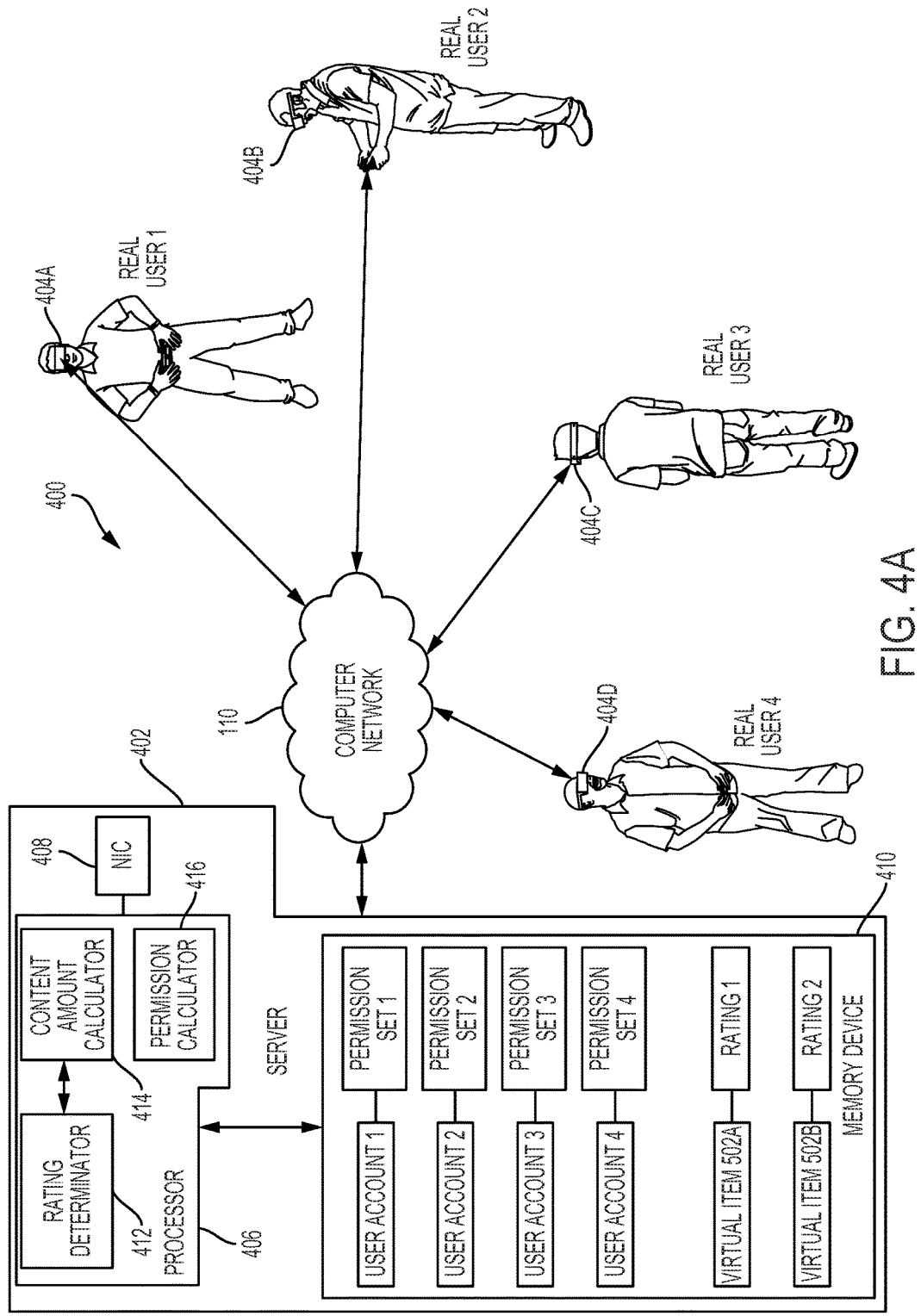
FIG. 4A is a diagram of an embodiment of a system to illustrate communication between HMDs and a server for facilitating tagging within a virtual environment.

FIG. 4A is a diagram of an embodiment of a system 400 to illustrate communication between users 1 through 4 and a server 402 for facilitating tagging within a virtual environment. The system 400 includes the server 402, the computer network 110, and multiple HMD s 404A, 404B, 404C, and 404D. Any of the HMDs 404A, 404B, 404C, and 404D is an example of the HMD 102 (FIG. 1). Moreover, the server 402 is a part of the cloud gaming provider 112. Also, in one embodiment, the terms user 1 and user 102 are used interchangeably herein. The HMD 404A is worn by the user 1 on his/her head. Similarly, the HMD 404B is worn by the user 2 on his/her head, the HMD 404C is worn by the user 3 on his/her head, and the HMD 404D is worn by the user 4 on his/her head.

The server 402 includes a processor 406, a network interface controller (NIC) 408, and a memory device 410. The processor 406 includes a rating determinator 412, a content amount calculator 414, and a permission calculator 416, all of which are further described below. Each of the rating determinator 412, the content amount calculator 414, and the permission calculator 416 is a software module or a hardware module. An example of the software module includes a computer program code and examples of the hardware module include an ASIC and a PLD. As used herein, the processor 406 is a CPU, or a controller, or an ASIC, or a PLD. Examples of the NIC 408 include a network interface card that is used to connect the server 402 to the computer network 110. Moreover, examples of the memory device 410 include a ROM, a RAM, or a combination that includes RAM and ROM. To illustrate, the memory device 410 is a flash memory device or a redundant array of independent disks (RAID). The processor 406 is coupled to the NIC 408 and the memory device 410.

The memory device 410 stores a user account 1 that is assigned to the user 1, a user account 2 that is assigned to the user 2, a user account 3 that is assigned to the user 3, and a user account 4 that is assigned to the user 4. In some embodiments, a user account is assigned to a user by the processor 406 when the user provides login information for logging into the user account. Examples of the login information include a user name, user information, a user identifier (ID), an email address, a password, or a combination thereof. The processor 406 determines whether the login information is assigned to another user, e.g., other than the user 1, and if not, the processor 406 links the login information to the user account of the user 1 to assign the user account to the user 1.

The processor 406 associates, such as links, establishes a one-to-one correspondence with, or maps, the user account 1 with a permission set 1, associates the user account 2 with a permission set 2, associates the user account 3 with a permission set 3, and associates the user account 4 with a permission set 4. For example, a user ID assigned to the user account 1 is linked to the permission set 1, a user ID assigned to the user account 2 is linked to the permission set 2, a user ID assigned to the user account 3 is linked to the permission set 3, and a user ID assigned to the user account 4 is linked to the permission set 4.

In one embodiment, a permission set associated with a user account of a user includes preferences received from the user via the user account, or privacy settings received from the user via the user account, or restrictions placed on the user account by the processor 406 based on the user's browsing history, or a demographic of the user, or restrictions placed on the user account by another user via an administrator user account, or a combination thereof. For example, a user logs into his/her user account to indicate a privacy setting in which no users other than social network friends of the user are able to view information posted by the user via the user account. As another example, based on the demographic, e.g., age, gender, etc., of the user received via a user account of the user, the processor 406 determines that the user cannot access information posted to the user account. As yet another example, when the user 1 indicates via his/her user account 1 that the user account 2 cannot access content created by the user 1, the permission set 2 of the user 2 is affected and is not allowed to access the content. The browsing history indicates which virtual item is interesting to a user or is desired by the user.

It should be noted that in some embodiments, a user logs into his/her user account when the processor 406 of the server 402 authenticates the login information received via the computer network 110 from an HMD worn by the user. The user selects various alphanumeric characters displayed on the HMD via the hand-held controller 104 operated by the user to provide the login information. In some embodiments, the login information is received from the HMD via the computer 106 (FIG. 1) and the computer network 110. For example, the user uses the hand-held controller 104 to provide the login information to the computer 106. The hand-held controller 104 communicates the login information to the computer 106 via a wired or wireless connection, examples of which are provided above.

Figure 5B:
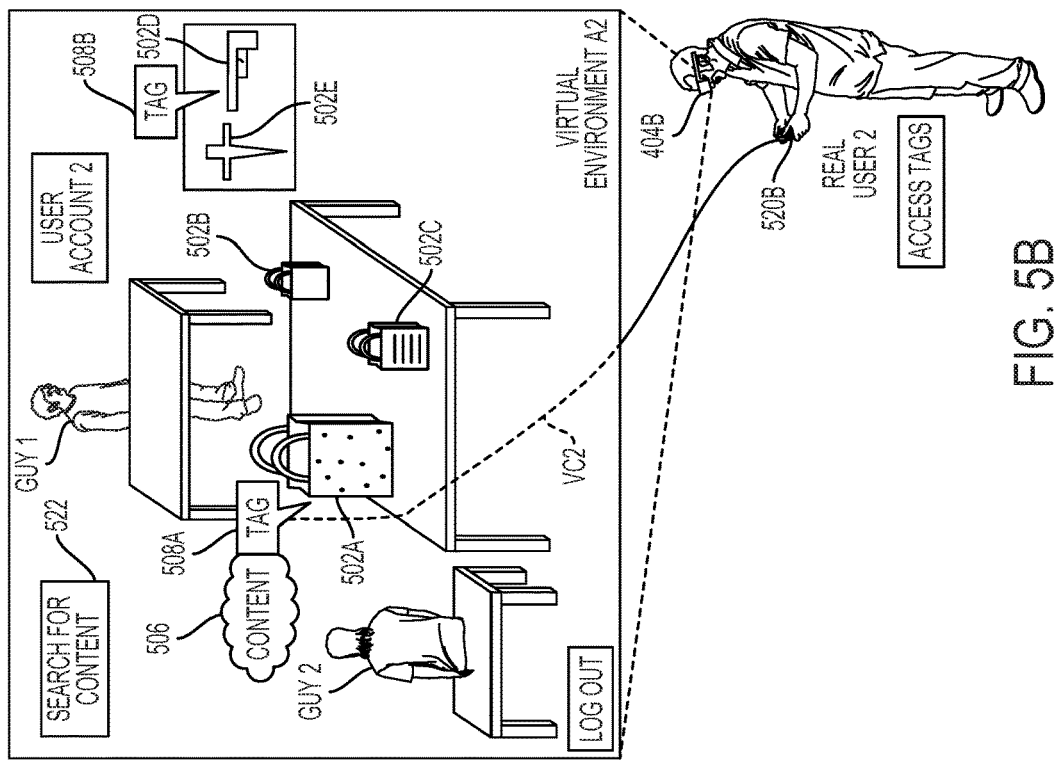
FIG. 5B is a diagram of an embodiment of a virtual environment to illustrate presentation of content when a user selects a tag or a virtual item.

The memory device 410 further stores an association, such as a link, a one-to-one correspondence, or a mapping, between a rating assigned to a virtual item by the rating determinator 412 and the virtual item. For example, a virtual item 502A is assigned a rating 1 and a virtual item 502B is assigned a different rating 2. In some embodiments, a rating is assigned to the virtual item by the rating determinator 412. Examples of a rating include a number, or an alphabet, or a combination thereof. In various embodiments, the terms rating and ranking are used interchangeably herein. A rating is assigned to a virtual item based on information regarding the virtual item, e.g., comments, posts, ranking, opinions, interests, hobbies, etc., posted within one or more user accounts of one or more users. For example, the virtual item 502A is assigned a higher rating than the virtual item 502B based on a number of user accounts expressing interest in the virtual items 502A and 502B. To illustrate, a first number of user accounts indicate that the virtual item 502A is of interest. Users access the first number of user accounts via hand-held controllers to indicate that that the virtual item 502A is of interest to them. Also, a second number of user accounts indicate that the virtual item 502B is interesting. Users access the second number of user accounts via hand-held controllers to indicate that that the virtual item 502B is of interest to them. When the first number of user accounts is greater than the second number of user accounts, the virtual item 502A is assigned a higher rating than the virtual item 502B. As another example, when the content amount calculator 414 determines that a number of users that interact with, e.g., hover over, click on, etc., the virtual item 502A via their corresponding user accounts to indicate their interest is greater than a number of users that interact with the virtual item via their corresponding user accounts, the virtual item 502A is assigned a higher rating by the rating determinator 412 than the virtual item 502B. As yet another example, when the content amount calculator 414 determines that a number of comments provided to the virtual item 502A via their corresponding user accounts regarding the virtual item 502A in a virtual environment is greater than a pre-determined number of comments and that a number of comments provided to other virtual items in the virtual environment is less than the pre-determined number, the virtual item 502A is assigned a higher rating by the rating determinator 412 than the other virtual items. The number of comments is an example of an amount of content. For example, content 506, illustrated below in FIG. 5B, is one comment and another content is another comment. It should be noted that the pre-determined number corresponds to, e.g., has a one-to-one relationship with, is linked to, etc., a pre-determined rating.

In some embodiments, instead of the processor 406, multiple processors are used to perform the functions illustrated herein. In various embodiments, instead of the memory device 410, multiple memory devices are used to store the data described herein.

In various embodiments, functions described herein as being performed by the server 402 are performed by multiple servers of the cloud gaming service 112.

Figure 4B:
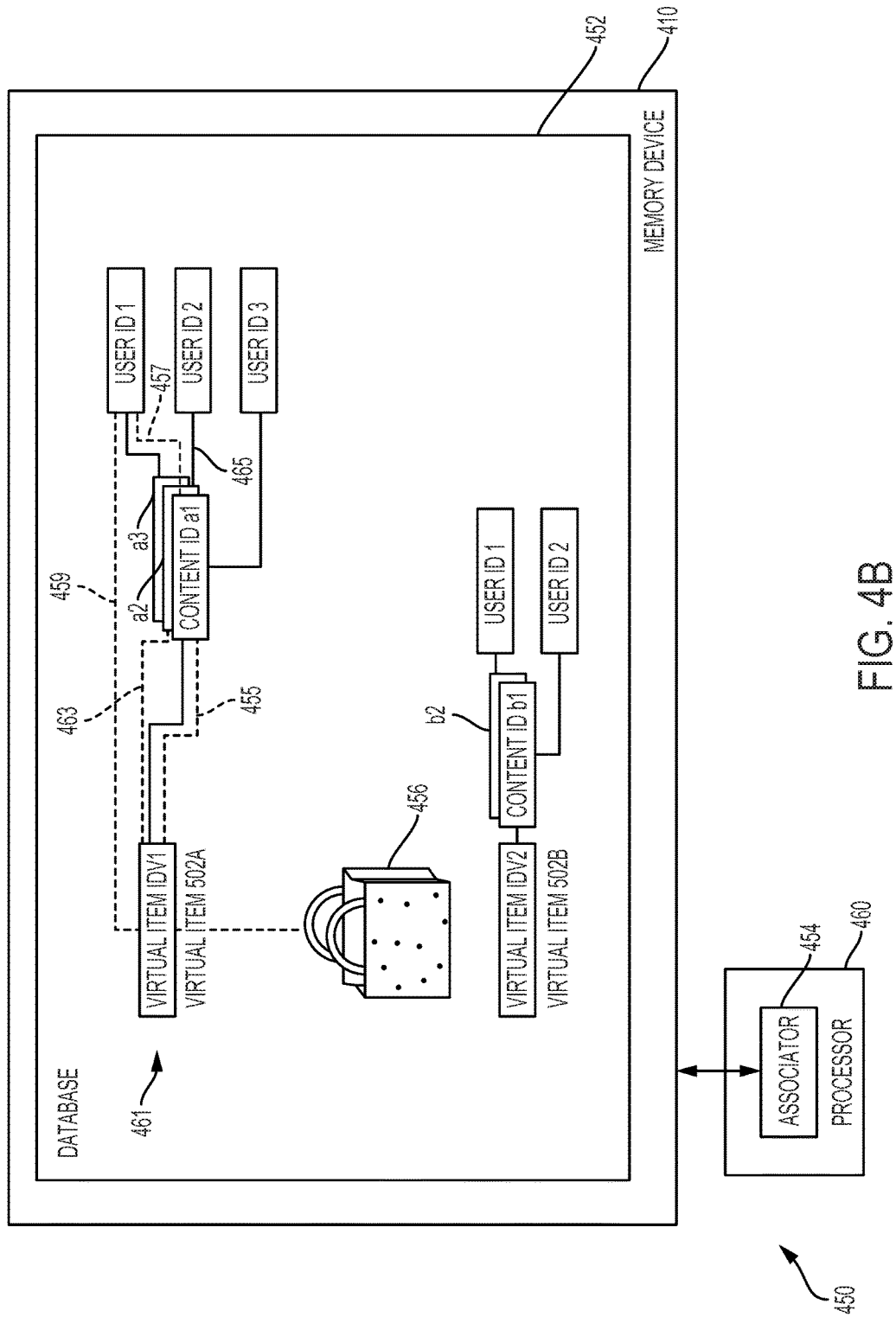
FIG. 4B is a diagram of an embodiment of a database to illustrate linking of a virtual item with different content and different user identifiers (IDs).

FIG. 4B is a diagram of an embodiment of a system 450 to illustrate a database 452 that stores an association between virtual items, content, and user IDs. The system 450 includes the processor 460 and the memory device 410. The processor 460 includes an associator module 454 that creates associations, e.g., links, mappings, etc., among the virtual items, content, and user IDs. For example, the associator module 454 links the virtual item 502A to a content IDa1, a content IDa2, and a content IDa3. A content ID is created by the processor 460 to identify content. For example, the content IDa1 is created by the processor 460 to identify the content 506. Similarly, the content IDa2 is created by the processor 460 to identify additional content 550, which is described below in FIG. 5C. Examples of user IDs includes a combination of alphanumeric characters or a combination of alphanumeric characters and symbols. Examples of content IDs includes a combination of alphanumeric characters or a combination of alphanumeric characters and symbols. The content 506 is created by the user 1 and received via the user account 1 that is assigned a user ID1. Moreover, the additional content 550 is created by the user 2 and received via the user account 2 that is assigned a user ID2. Also, content having the content IDa3 is created by the user 3 and received via the user account 3 that is assigned a user ID3. As another example, the associator module 454 links the virtual item 502B to a content IDb1 and content IDb2. Moreover, content having the content IDb1 is created by the user 1 and received via the user account 1 that is assigned the user ID1. Also, content having the content IDb2 is created by the user 2 and received via the user account 2 that is assigned the user ID2.

Figure 5A:
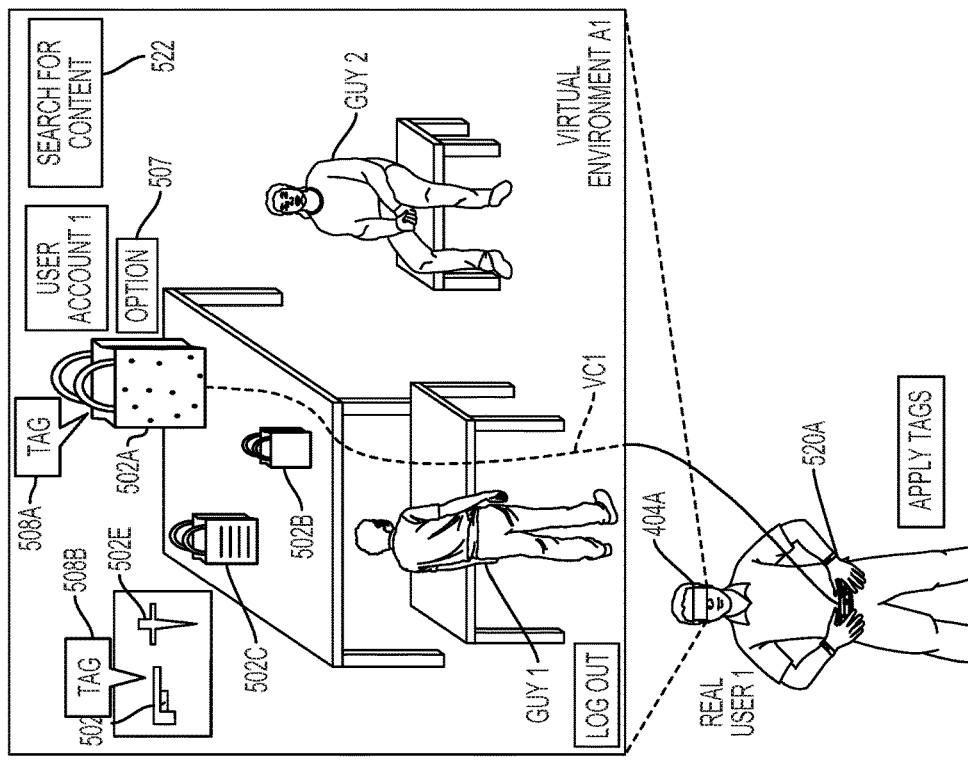
FIG. 5A is a diagram illustrating a virtual environment that is displayed on an HMD that is worn by a user to illustrate generation of a tag.

FIG. 5A is a diagram illustrating a virtual environment A1 that is displayed on the HMD 404A that is worn by the user 1. The virtual environment A1 is a view of a virtual store for leasing or buying virtual items 502A, 502B, 502C, 502D, and 502E. For example, upon determining that the user account 1 of the user 1 is authenticated and determining that the user account 1 has permission to access the virtual store, a computer program is executed by the processor 406 (FIG. 4A) to generate data, which is encoded by an encoder of the server 402, and sent by the NIC 408 of the server 401 via the computer network 110 for displaying the virtual environment A1 on the HMD 404A. The encoder of the server system 402 is coupled to the processor 406 and to the NIC 408. The NIC 408 applies a communication protocol, e.g., Transmission Control Protocol over Internet Protocol (TCP/IP), etc., to packetize the encoded data to generate packets, which are then sent via the computer network 110. The computer 106 includes the NIC 107 that depacketizes the encoded data, and further includes a decoder that decodes the encoded data. The computer 106 sends the decoded data via the wired or wireless connection to the HMD 404A for display of the decoded data on the display device of the HMD 404A. In one embodiment, the HMD 404A includes a NIC that applies the communication protocol to extract the encoded data and further includes a decoder that decodes the encoded data.

The user 1 has logged into his/her user account 1 to access the virtual environment A1. After logging into the user account 1, the user 1 makes a selection associated with the virtual item 502A. For example, the user 1 makes a gesture, e.g., a pointing gesture to point his/her finger at the virtual item 502A, etc., to select the virtual item 502A. As another example, the user 1 hovers a mouse pointer on the virtual item 502A or clicks on the virtual item 502a with the mouse pointer to select the virtual item 502A. A direction of movement of the mouse pointer is controlled via a hand-held controller 520A, e.g., a Playstation Move™ controller, a joystick, a pen controller, a wireless controller, etc., operated by the user 1. The hand-held controller 520A is an example of the hand-held controller 104 of FIG. 2B.

To indicate that the virtual item 502A is about to be selected, the processor 406 generates a virtual curve VC1 that is displayed in the HMD 404A as pointing to the virtual item 502A. Data for the display of the virtual curve VC1 is packetized and sent from the NIC 408 via the computer network 110 to the NIC 107 of the computer 106. The NIC 107 of the computer 106 depacketizes the data and sends the data via the wired or wireless connection to the HMD 404A to display the virtual curve VC1 on the display device of the HMD 404A. In one embodiment, the data for the display of the virtual curve VC1 is packetized and sent from the NIC 408 via the computer network 110 to the NIC of the HMD 404A. The NIC of the HMD 404A depacketizes the data to display the virtual curve VC1 on the display device of the HMD 404A.

The gesture made by the user 1 is captured by the camera 108 (FIG. 1), or a camera of the HMD 404A. The camera 108 sends an indication of, e.g., data indicating, image data of, etc., the gesture via a wired or a wireless connection to the computer 106 to packetize the image data and the packetized data is sent from via the computer network 110 to the NIC 408. When the camera of the HMD 404A captures the gesture, the camera of the HMD 404A sends the indication of the gesture via the wired or wireless connection to the computer 106, which packetizes and sends the indication of the gesture via the computer network 110 to the NIC 408 of the server 402. In one embodiment, when the camera of the HMD 404A captures the gesture, the HMD 404A packetizes and sends the indication of the gesture via the computer network 110 to the NIC 408 of the server 402. Similarly, when the selection of the virtual item 502A is made via the mouse pointer, data indication the selection is sent from the hand-held controller 520A via the wired or wireless connection to the computer 106. The computer 106 packetizes the data indicating the selection and sends the packets via the computer network 106 to the NIC 408.

The NIC 408 of the server 402 receives the data indicating the selection made using the gesture or the click and provides the data to the processor 406 of the server 402. The processor 406 processes the data indicating the selection associated with the virtual item 502A by the user 1 to generate option data, e.g., data for generating a field for entry of text, data for enabling entry of audio content, data for enabling receipt of video content, a button for enabling entry of the audio content, a button for enabling recording of the video content, etc., and provides the option data to the NIC 408. The NIC 408 packetizes and sends the option data via the computer network 110 to the NIC 107 of the computer 106, which sends the option data via the wired or wireless connection to the HMD 404A. In one embodiment, the NIC 408 packetizes and sends the option data via the computer network 110 to the NIC of the HMD 404A.

The option data is displayed as an option 507, e.g., an audio button, a video recording button, a text entry field, etc., on the HMD 404A for entry of content 506, which is illustrated in FIG. 5B. For example, a field is displayed within the virtual environment A1. The user 1 makes a gesture to select the text entry field and provides the content 506, e.g., text, graphics, etc. As another example, the user 1 clicks the hand-held controller 520A to select the text entry field and further selects various alphanumeric characters displayed on the HMD 404A to provide the content 506. As yet another example, the user 1 provides the content 506, such as sound data, into a microphone of the HMD 404A. As still another example, the user 1 provides the content 506, such as video content, to the camera 108 or the camera on the HMD 404A. Examples of the content 506 include text, audio, video, graphics, or a combination thereof. Illustrations of the content 506 include "I love this purse", "this purse is awesome", "I do not like this purse", "This purse is horrible", "This purse broke the day after I bought it", a sad emoji, a happy emoji, an upset emoji, a mad emoji, etc.

The content 506 is sent from the HMD 404A via the wired or wireless connection to the computer 106. The NIC 107 of the computer 106 packetizes the content 506 and sends the packets via the computer network 110 to the NIC 408. The NIC 408 receives the content 506 and provides the content 506 to the processor 406. In one embodiment, the content 506 is packetized by and sent from the NIC of the HMD 404A via the computer network 110 to the NIC 408.

The processor 406 of the server 402 associates, such as establishes a one-to-one correspondence between, establishes a mapping between, a link between, or establishes a unique relationship between, the virtual item 502A, the content 506, and the user account 1 to which access is provided to receive the content 506 from the user 1. For example, with reference to FIG. 4B, the processor 406 creates an entry 461 in the database 452. The entry 461 includes storage in the database 452 of a virtual item IDv1 assigned to the virtual item 502A by the processor 406. The entry 461 further includes storage in the database 452 of the content IDa1 assigned to the content 506 by the processor 406. Also, the entry 461 includes storage in the database 452 of the user ID1. The user ID1 is assigned to the user account 1 by the processor 406. For example, the user ID1 includes a user name, or a password, or a combination thereof. The user ID1 is provided by the user 1 to authenticate the user account 1. The processor 406 establishes a link 455 between the virtual item IDv1 and the content IDa1 and creates a link 457 between the content IDa1 and the user ID1. To illustrate, the processor 406 creates a pointer from a memory region, e.g., a memory cell, of the memory device 410 that stores the virtual item IDv1 to a memory region of the memory device 410 that stores the content IDa1. Moreover, the processor 406 creates a pointer from a memory region of the memory device 410 that stores the user ID1 to a memory region of the memory device 410 that stores the content IDa1. As another example, the processor 406 creates a link 459 between the virtual item IDv1 and the user ID1. To illustrate, the processor 406 creates a pointer from a memory region of the memory device 410 that stores the user ID1 to a memory region of the memory device 410 that stores the virtual item IDv1.

The processor 406 of the server 402 generates tag data in response to associating the content 506 with the virtual item 502A and/or with the user account 1, and sends the tag data to the NIC 408. The NIC 408 packetizes the tag data and sends the packetized tag data via the computer network 110 to the NIC 107 of the computer 106. The computer 106 sends the tag data via the wired or wireless connection to the HMD 404A. In one embodiment, the NIC 408 packetizes the tag data and sends the packetized tag data via the computer network 110 to the NIC of the HMD 404A.

Referring back to FIG. 4A, the processor 406 of the server 402 creates a link between a tag identifier TI1 that identifies a tag 508A having the tag data and the virtual item IDv1 and creates a link between the tag identifier TI1 and the content IDa1, and stores the links in the database 452. The tag identifier TI1 includes one or more alphanumeric characters, or one or more symbols, or a combination thereof, and is assigned to the tag 508A by the processor 406. For example, the processor 406 creates a pointer from a memory region of the memory device 410 that stores the content IDa1 to a memory region of the memory device 410 that stores the tag identifier TI1.

Upon receiving the tag data, the tag 508A is displayed within the virtual environment A1 on the HMD 404A as being associated with the virtual item 502A. For example, a pointer of the tag 508A points towards the virtual item 502A. As another example, the tag 508A is located within a pre-determined distance from the virtual item 502A. As yet another example, the tag 508A is located closest to the virtual item 502A compared to all other virtual items in the virtual environment A1. Similarly, a tag 508B associated with a virtual item 508D is generated and displayed on the HMD 404A.

In some embodiments, a virtual item is a virtual good, e.g., a shoe, a dress, a short, a pant, a piece of jewelry, a piece of clothing, a vehicle, a building, a house, etc., that is either sold or leased. For example, an HMD worn by a user displays an avatar of the user, e.g., a virtual user, etc., wearing the virtual good so that the user can determine whether to purchase or lease an actual good represented by the virtual good. In various embodiments, a virtual item is a virtual service.

FIG. 5B is a diagram of an embodiment of a virtual environment A2 to illustrate presentation of the content 506 when the user 2 selects the tag 508A or the virtual item 502A. One or more buttons on a hand-held controller 520B are selected by the user 2 to provide the login information regarding the user account 2 via the wired or wireless link to the computer 106. The NIC 107 of the computer 106 packetizes and sends the login information of the user account 2 via the computer network 110 to the processor 406 of the server 402 for authentication. In one embodiment, a NIC of the HMD 404B packetizes and sends the login information of the user account 2 via the computer network 110 to the processor 406 of the server 402 for authentication.

When the user information, e.g., the user ID2, that is assigned to the user account 2 of the user 2 and received from the computer 106 or the NIC of the HMD 404B is authenticated by the processor 406 of the server 402, the NIC 408 of the server 402 sends, via the computer network 110, virtual environment data for display of the virtual environment A2 on the head-mounted display 404B. For example, the virtual environment data for the virtual environment A2 is encoded by the encoder of the server 402 and send to the NIC 408. The NIC 408 sends the virtual environment data for display of the virtual environment A2 via the computer network 110 to the NIC 107 of the computer 106. The NIC 107 of the computer 106 depacketizes the encoded virtual environment data to extract the encoded virtual environment data. The encoded virtual environment data is decoded by the decoder of the computer 106 to output the virtual environment data and the virtual environment data is sent via a wired or wireless connection from the computer 106 to the HMD 404B for display of the virtual environment A2 on a display device of the HMD 404B.

In one embodiment, the NIC 408 packetizes the encoded virtual environment data and sends the packetized virtual environment data via the computer network 110 to the HMD 404B. The NIC of the HMD 404B depacketizes the encoded virtual environment data to extract the encoded virtual environment data. The encoded virtual environment data is decoded by a decoder of the HMD 404B to output the virtual environment data for display of the virtual environment A2 on a display device of the HMD 404B.

The virtual environment A2 excludes the content 506 and the virtual item 502A but includes the tag 508A. In one embodiment, the virtual environment A2 includes the virtual item 502A and the tag 508A, but excludes the content 506. The virtual environment A2 has the other virtual items 502B, 502C, 502D, and 502E, and the tag 508B. In one embodiment, the virtual items 502A through 502E and the content 506 are stored in the database 452, and accessible from the database 452 via the computer network 110.

The user 2 selects the tag 508A that is associated with the virtual item 502A or selects the virtual item 502A. For example, the user 2 makes a gesture, which is captured by the camera 108 or by a camera of the HMD 404B, to select the tag 508A or the virtual item 502A. To illustrate, the user 2 points his/her finger at the tag 508A to select the tag 508A or at the virtual item 502A to select the virtual item 502A. To indicate that the virtual item 502A or the tag 508A is about to be selected, the processor 406 generates a virtual curve VC2 that is displayed in the HMD 404B as pointing to the virtual item 502A or the tag 508A. As another example, the user 2 selects a button on the hand-held controller 520B operated by the user 2 to select the tag 508A or the virtual item 502A. When the tag 508A or the virtual item 502A is selected, an indication, e.g., a signal indicating the selection, etc., is sent from the HMD 404B via the NIC 107 of the computer 106, the computer network 110, and the NIC 408 to the processor 406 of the server 402. In one embodiment, the indication of the selection of the tag 508A is packetized by the NIC of the HMD 404B and sent from the NIC of the HMD 404B via the computer network 110 and the NIC 408 to the processor 406 of the server 402.

The permission calculator 416, shown in FIG. 4A, of the processor 406 of the server 402 determines whether the user account 2 of the user 2 has permission to access the content 506 associated with the tag 508A upon receiving the indication of the selection of the tag 508A or the virtual item 502A. For example, the processor 406 accesses the permission set 2 associated with the user account 2 to determine whether the user account 2 has the permission to access the content 506. To illustrate, the user account 2 has permission, as indicated by the permission set 2, when the user 1 provides permission via his/her permission set 1 to allow access to the content 506. As another illustration, the user account 2 has permission to access the content 506 when the user account 2 indicates that the user 2 satisfies a demographic threshold, e.g., a pre-determined age, a pre-determined interest, a pre-determined hobby, etc., indicated in the permission set 2. Upon receiving the determination from the permission calculator 416 of the processor 406 that the user account 2 has the permission, the NIC 408 of the server 402 sends content data via the computer network 110 to the computer 106. The computer 106 sends via the wired or wireless connection the content data to the HMD 404B for displaying the content 506 within the user account 2 on the HMD 404B. In one embodiment, the content data is sent from the NIC 408 via the computer network 110 to the HMD 404B for displaying the content 506 via the user account 2 on the HMD 404B.

It should be noted that in an embodiment, when the user 2 logs into the user account 2 to access the virtual environment A2, the user 1 has logged out of the user account 1. For example, the user 1 logs out of the user account 1 by selecting one or more buttons on the hand-held controller 520A to select a logout button displayed within the virtual environment A1 on the HMD 404A. The selection data indicating the selection of the logout button is sent from the HMD 404A via the wired or wireless connection to the computer 106. The selection data is packetized and sent from the NIC 107 of the computer 106 via the computer network 110 to the NIC 408. In one embodiment, the selection data indicating the selection of the logout button is packetized and sent from the NIC of the HMD 404B via the computer network 110 to the NIC 408, which depacketizes the selection data.

The processor 408 of the server 402 receives the selection data from the NIC 408 of the server 402 and determines not to send the virtual environment A1 to the HMD 404A via the computer network 110 to facilitate the logout from the user account 1. As another example of the logout from the user account 1, the user 1 makes a gesture to select the logout button displayed within the virtual environment A1. The gesture indicating the selection of the logout button is captured as image data by the camera 108 or the camera of the HMD 404A. The image data indicating the selection of the logout button is sent from the HMD 404A via the wired or wireless connection to the computer 106. The image data is packetized and sent from the NIC 107 of the computer 106 via the computer network 110 to the NIC 408. In one embodiment, the image data indicating the selection of the logout button is packetized and sent from the NIC of the HMD 404B via the computer network 110 to the NIC 408. It should be noted that when the user 1 logs out of the user account 1 and the user 2 is logged into the user account 2, there is asynchronous communication between the users 1 and 2 of the content 506.

In one embodiment, the virtual environment A2 includes a search field 522 but excludes the content 506, the tag 508A, and the virtual item 502A. The user 2, after logging to the user account 2, makes a gesture to search for the virtual item 502A. For example, the user 2 moves his/her finger to spell a name of the virtual item 502A. When the user 2 makes the gesture, the camera 108 or the camera of the HMD 404B worn by the user 2 captures image data of the gesture. The image data is sent from the camera 108 to the computer 106 via the wired or wireless connection. The NIC 107 of the computer 106 packetizes the image data and sends the packets via the computer network 110 to the NIC 408. In one embodiment, the image data is packetized and sent from the HMD 404B via the computer network 110 to the NIC 408 without using the computer 106.

In an embodiment, the user 2 selects one or more buttons on the hand-held controller 520B to provide a search query, e.g., a description, alphanumeric characters, etc., describing or identifying the virtual item 502A to the search field 522. The search query data is sent from the hand-held controller 520B to the computer 106 via the wired or wireless connection between the hand-held controller 520B and the computer 106. The NIC 107 of the computer 106 packetizes the search query data and sends the packets via the computer network 110 to the NIC 408.

The processor 406 of the server 402 receives the search query from the NIC 408, determines that the search query identifies the virtual item 502A. The permission calculator 416 of the processor 406 determines based on the permission set 2 having permissions for the user account 2 of the user 2 whether the user account 2 will be allowed to access the virtual item 502A, the tag 508A, and the content 506 regarding the virtual item 502A. For example, the permission set 2 does not allow the user account 2 to access the virtual item 502A and/or the content 506 and/or the tag 508A upon determining that a demographic profile stored within the user account 2 indicates that the user 2 is not qualified, e.g., is a minor, does not have interest, does not meet the demographic threshold, etc.

Upon determining that the user account 2 has permission based on the permission set 2 to access the virtual item 502A, the processor 406 searches the memory device 410 for the model of the virtual item 502A based on the identifier IDv1 of the virtual item 502A, for the content 506 based on the identifier IDa1 of the content 506, and for the tag 508A that is associated with the content 506. The processor 406 sends the model data, content data, and tag data for the virtual item 502A to the encoder of the server 402. The encoder of the server 402 encodes the model, tag, and content data and sends the encoded model, tag, and content data to the NIC 408. The NIC 408 packetizes the encoded model, tag, and content data to generate packets, and sends the packets via the computer network 110 to the NIC 107 of the computer 110. The NIC 107 of the computer 106 depacketizes the encoded model, tag, and content data to extract the encoded model, tag, and content data and provides the encoded model, tag, and content data to the decoder of the computer 106. The decoder of the computer 106 decodes the encoded model, tag, and content data to output the model, tag, and content data and provides the model, tag, and content data to the display device of the HMD 404B via the wired or the wireless connection for display of the three-dimensional view of the virtual item 502A, the content 506, and the tag 508A on the display device of the HMD 404B.

In one embodiment, the NIC 408 packetizes the encoded model, tag, and content data to generate packets, and sends the packets via the computer network 110 to the NIC of the HMD 404B. The NIC of the HMD 404B depacketizes the encoded model, tag, and content data to extract the encoded model, tag, and content data and provides the encoded model, tag, and content data to the decoder of the HMD 404B. The decoder of the HMD 404B decodes the encoded model, tag, and content data to output the model, tag, and content data and provides the model, tag, and content data to the display device of the HMD 404B for display of the three-dimensional view of the virtual item 502A, the content 506, and the tag 508A on the display device of the HMD 404B.

In one embodiment, when the processor 406 determines that the user account 2 has permission to access the virtual item 502A, the rating determinator 412, shown in FIG. 4A, of the processor 406 determines whether the rating 1 assigned to the virtual item 502A is greater than the pre-determined rating and the ratings assigned to other virtual items in the virtual environment A2 is less than the pre-determined rating. Upon determining that the virtual item 502A is assigned the rating 1 that is greater than the pre-determined rating and the ratings assigned to other virtual items in the virtual environment A2 is less than the pre-determined rating, the processor 406 determines to display the virtual item 502A within the virtual environment A2 in a more prominent location compared to other virtual items in the virtual environment A2. For example, the processor 406 sends with the virtual item data via the NIC 408 and the computer network 110 to the computer 106 for displaying the virtual item 502A in the virtual environment A2, the prominent location at which the virtual item 502A is to be displayed in the virtual environment A2. The computer 106 receives the data indicating the prominent location and provides the data to the display device of the HMD 404B to display the virtual item 502A in the prominent location compared to the virtual items 502B through 502E. For example, the virtual item 502A has less depth on the display device of the HMD 404B compared to depth of the virtual items 502B through 502E on the display device of the HMD 404B.

In one embodiment, the processor 406 sends with the virtual item data via the NIC 408 and the computer network 110 to the HMD 404B for displaying the virtual item 502A in the virtual environment A2, the prominent location at which the virtual item 502A is to be displayed in the virtual environment A2. The prominent location is not sent to the computer 106. The HMD 404B receives the data indicating the prominent location and provides the data to the display device of the HMD 404B to display the virtual item 502A in the prominent location compared to the virtual items 502B through 502E In various embodiments, instead of displaying the virtual item 502A in the prominent location, the virtual item 502A is highlighted, e.g., bolded, enlarged, displayed using a different color, displayed using a different shading, displayed using a different texture, or a combination thereof, etc., compared to other virtual items 502B through 502E on the display device of the HMD 404B.

Figure 5C:
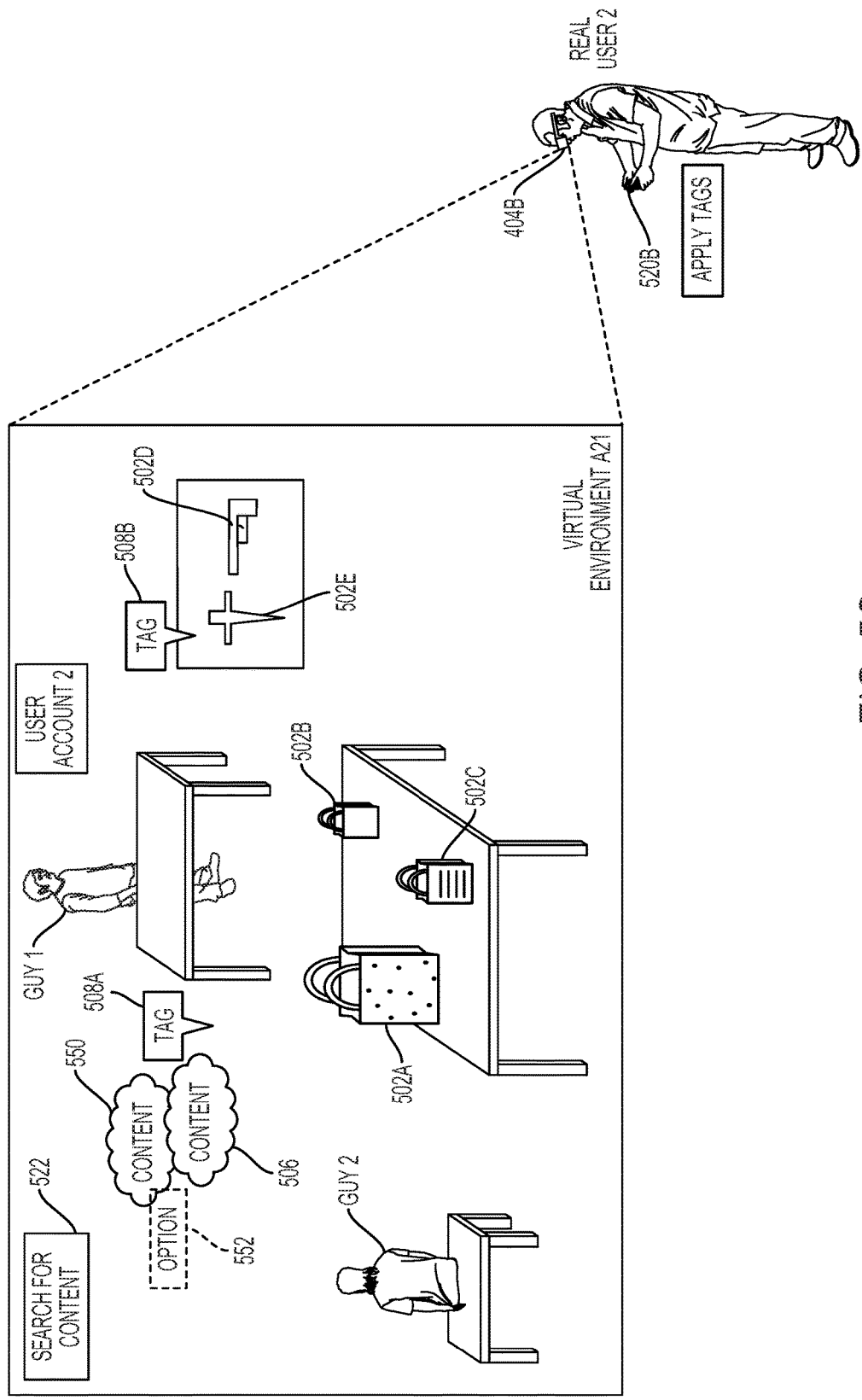
FIG. 5C is a diagram of an embodiment of a virtual environment to illustrate content that is added on top of another content in the virtual environment.

FIG. 5C is a diagram of an embodiment of a virtual environment A21 to illustrate building of the additional content 550 on top of the content 506. Upon viewing the content 506, the user 2 uses the controller 520B or performs a gesture to select the tag 508A or the content 506 or the virtual item 502A. To illustrate, the user 2 points his/her finger at the content 506 to select the content 506. As another illustration, the user 2 selects a button on the hand-held controller 520B operated by the user 2 to select the content 506.

Data indicating the gesture to select the tag 508A or the content 506 or the virtual item 502A is communicated from the HMD 404B or from the camera 108 (FIG. 1) via the computer network 110 (FIG. 1) and the NIC 408 (FIG. 4A) to the processor 406. For example, when the content 506 is selected, an indication, e.g., data indicating the selection, etc., is sent from the HMD 404B via the NIC 107 of the computer 106, the computer network 110, and the NIC 408 to the processor 406. In one embodiment, the indication of the selection of the content 506 is packetized by the NIC of the HMD 404B and sent from the NIC of the HMD 404B via the computer network 110 and the NIC 408 to the processor 406. When the hand-held controller 520B is used, data indicating the selection of the tag 508A or the content 506 or the virtual item 502A is sent from the hand-held controller 520B via the computer 106 and the computer network 110 (FIG. 1) and the NIC 408 (FIG. 4A) to the processor 406.

Upon receiving the data indicating the gesture or the selection, the processor 406 generates additional option data, e.g., data for generating a field for entry of text, data for enabling entry of audio content, data for enabling receipt of video content, a button for enabling entry of the audio content, a button for enabling recording of the video content, etc. The NIC 408 packetizes and sends the additional option data via the computer network 110 to the NIC 107 of the computer 106, which sends the additional option data via the wired or wireless connection to the HMD 404B. In one embodiment, the additional option data is sent from the NIC 408 via the computer network 110 to the NIC of the HMD 404B without using the computer 106.

The additional option data is displayed as an option 552, e.g., an audio button, a video recording button, a text entry field, etc., on the HMD 404B for entry of the additional content 550. For example, a text entry field is displayed within the virtual environment A2. The user 2 makes a gesture to select the text entry field and provides the additional content 550, e.g., text, graphics, etc. As another example, the user 2 clicks the hand-held controller 520B to select the text entry field and further selects various alpha-numeric characters displayed on the HMD 404B to provide the additional content 550. As yet another example, the user 2 provides the additional content 550, such as sound data, into a microphone of the HMD 404B. As still another example, the user 2 provides the additional content 550, such as video content, to the camera 108 or the camera on the HMD 404B. Examples of the additional content 550 include text, audio, video, graphics, or a combination thereof. Illustrations of the additional content 550 include "I too love this purse", "I agree that this purse is awesome", "I do not like this purse as well", "This purse is alright according to my friend", "This purse lasted forever for me", "I agree with user ID1", a sad emoji, a happy emoji, an upset emoji, a mad emoji, etc.

The additional content 550 is sent from the HMD 404B via the wired or wireless connection to the computer 106. The NIC 107 of the computer 106 packetizes the additional content 550 and sends the packets via the computer network 110 to the NIC 408 of the server 402. In one embodiment, the additional content 550 is packetized by and sent from the NIC of the HMD 404B via the computer network 110 to the NIC 408 without using the computer 106. The NIC 408 receives the additional content 550 and provides the additional content 550 to the processor 406 of the server 402.

The processor 406 associates, e.g., establishes a one-to-one correspondence between, establishes a mapping between, a link between, establishes a unique relationship between, etc., the virtual item 502A and the additional content 550, creates a link between the additional content 550 and the user ID2 of the user 2, and creates a link between the additional content 550 and the tag 508A. For example, with reference to FIG. 4B, the processor 406 modifies the entry 461 in the database 452. The entry 461 includes storage in the database 452 of content IDa2 assigned to the additional content 550 by the processor 406. Also, the entry 461 includes storage in the database 452 of the user ID2. The user ID2 is assigned to the user account 2 by the processor 406. For example, the user ID2 includes a user name, or a password, or a combination thereof. The user ID2 is provided by the user 2 to authenticate the user account 2. The processor 406 establishes a link 463 between the virtual item IDv1 and the content IDa2 and creates a link 465 between the content IDa2 and the user ID2. To illustrate, the processor 406 creates a pointer from a memory region, e.g., a memory cell, of the memory device 410 that stores the virtual item IDv1 to a memory region of the memory device 410 that stores the content IDa2. Moreover, the processor 406 creates a pointer from a memory region of the memory device 410 that stores the user ID2 to a memory region of the memory device 410 that stores the content IDa2. The processor 406 establishes a link 463 between the content IDa2 and the tag identifier TI1. As an example, the processor 406 creates a pointer from a memory region of the memory device 410 that stores the tag identifier TI1 to a memory region of the memory device 410 that stores the content IDa2. When the user 3 selects the tag 508A, the content 506 and the content 550 are displayed on an HMD worn by the user 3.

Figure 5D:
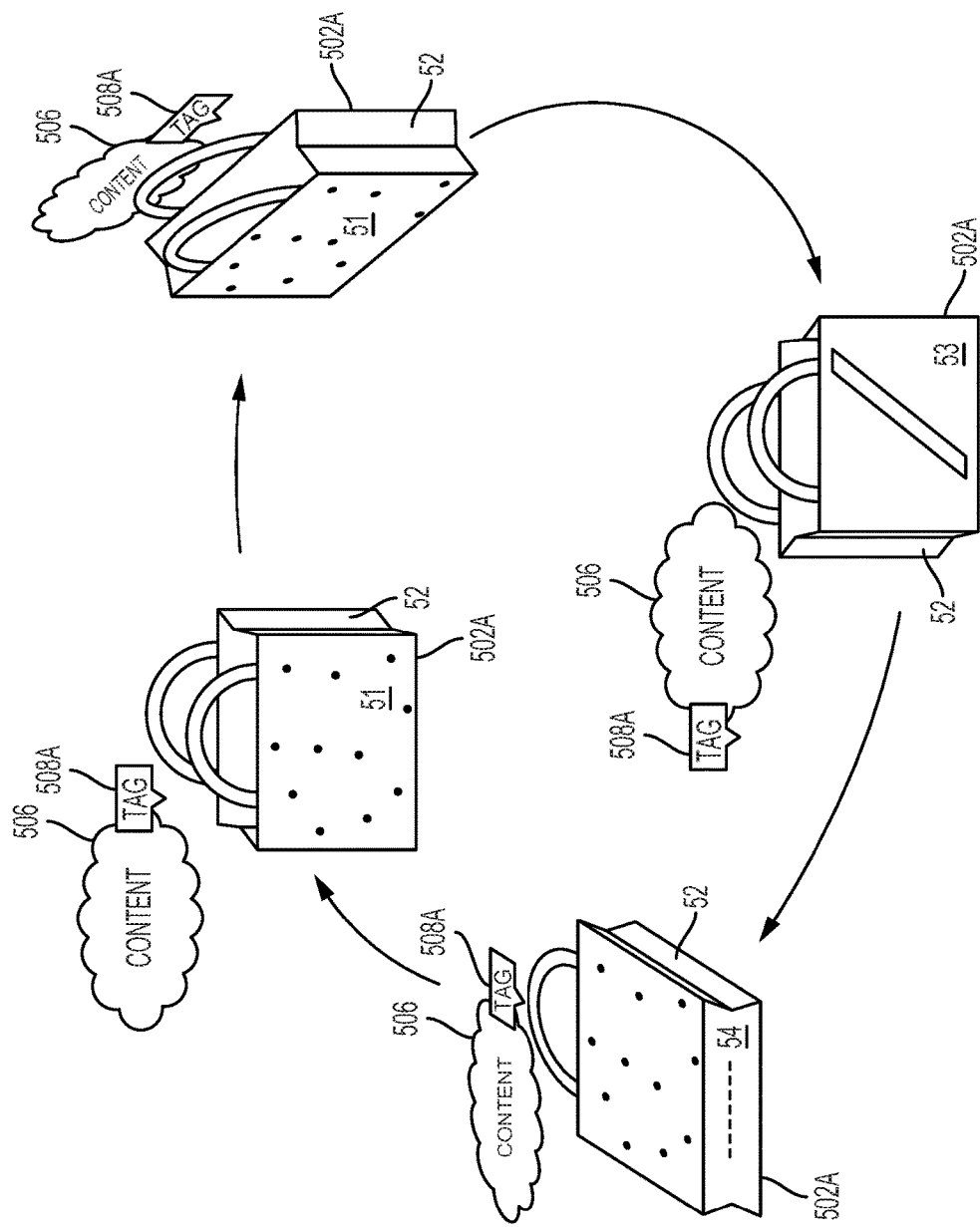
FIG. 5D is a diagram to illustrate different perspective view of a virtual item.

FIG. 5D is a diagram to illustrate different perspective views of the virtual item 502A based on a gesture made by a real user, e.g., the user 1, the user 2, etc. When the real user who is wearing an HMD has the HMD facing a side S1 of the virtual item 502A, the virtual item 502A, the content 506, and/or the tag 508A are displayed on the HMD in a first orientation, e.g., perspective, etc. However, when the user wearing the HMD moves his/her head to change an orientation of the HMD to face a side S2 of the virtual item 502A, the virtual item 502A, the content 506, and/or the tag 508A are displayed on the HMD in a second orientation, e.g., perspective, etc. The second orientation forms an angle, e.g., 90 degrees, between 70 and 90 degrees, etc., with respect to the first orientation. When the virtual item 502A is displayed in the second orientation, the side S2 of the virtual item 502A that was not displayed before in the first orientation is now displayed on the HMD.

Similarly, when the user wearing the HMD moves his/her head to change an orientation of the HMD to face a side S3 of the virtual item 502A, the virtual item 502A, the content 506, and/or the tag 508A are displayed on the HMD in a third orientation, e.g., perspective, etc. The third orientation forms an angle, e.g., 90 degrees, between 70 and 90 degrees, etc., with respect to the second orientation. As an example, the third orientation of the content 506 is a mirror image of the first orientation of the content 506. As another example, in both the first and third orientations, the content 506 and the tag 508A are displayed within a vertical plane. When the virtual item 502A is displayed in the third orientation, the side S3 of the virtual item 502A that was not displayed before in the first orientation and in the second orientation is now displayed on the HMD.

Also, when the user wearing the HMD moves his/her head to change an orientation of the HMD to face a side S4 of the virtual item 502A, the virtual item 502A is displayed on the HMD in a fourth orientation, e.g., perspective, etc., with the content 506 in the fourth orientation and/or the tag 508A in the fourth orientation. The fourth orientation forms an angle, e.g., 90 degrees, between 70 and 90 degrees, etc., with respect to the third orientation. As an example, in the fourth orientation, the content 506 and the tag 508A are displayed within a horizontal plane. When the virtual item 502A is displayed in the fourth orientation, another side S4 of the virtual item 502A that was not displayed before in the first orientation, the second orientation, and the third orientation is now displayed on the HMD. As illustrate, the side S1 is adjacent to the side S2. The side S3 is adjacent to the side S2 and is separated from the side S1 by the side S2. Moreover, the side S4 is adjacent to the side S2, the side S1, and the side S3.

With reference to FIG. 4B, the database 452 stores a model of the virtual item 502A to facilitate the different perspective views of the virtual item 502A. The different perspectives are displayed within a virtual environment, such as the virtual environment A1 or the virtual environment A2. For example, the database 452 stores a series of image frames, which are combined by the processor 406 to generate a three-dimensional model of the virtual item 502A. Each of the image frames includes graphics data, e.g., data of a geometry of the virtual item 502A, data of a shape of the virtual item 502A, data of shading of the virtual item 502A, data of one or more colors the virtual item 502A, data of one or more light intensities of the virtual item 502A, data of a texture of the virtual item 502A, or a combination thereof, etc. As an example, the texture is a function of lighting of the virtual item 502A, a number of polygonal pieces that are combined and arranged to form the virtual item 502A, and one or more colors of the virtual item 502A.

The model is encoded by the encoder of the server 402, is then packetized and sent from the NIC 408 via the computer network 110 to the NIC 107 of the computer 106. The NIC 107 of the computer 106 depacketizes the model to provide encoded modeled data to the decoder of the computer 106. The decoder of the computer 106 decodes the encoded modeled data to output the modeled data, which is sent from the computer 106 via the wired or wireless connection to the HMD. The model is then displayed on the display device of the HMD.

In one embodiment, the model is encoded by the encoder of the server 402, is then packetized and sent from the NIC 408 via the computer network 110 to the NIC of the HMD. The NIC of the HMD depacketizes the model to provide encoded modeled data to the decoder of the HMD. The decoder of the HMD decodes the encoded modeled data to output the modeled data and the model is displayed on the display device of the HMD.

The camera 108 captures the different movements of the head of the user to generate image data. The camera 108 sends the image data to the NIC 107 of the computer 110 via the wired or wireless connection. The NIC 107 of the computer 110 packetizes the image data and sends the image data via the computer network 110 to the NIC 408.

The processor 406 receives the image data from the NIC 408 and executes the computer program to change a perspective view of the virtual item 502A, a perspective view of the content 506, and/or a perspective view of the tag 508A based on a position and orientation of the head of the user in the image data. The processor 406 sends the perspective view data for the position and orientation of the head to the encoder of the server 402. The encoder encodes the perspective view data and sends the encoded data to the NIC 408, which packetizes the encoded data. The NIC 408 sends the packets having the encoded data via the computer network 110 to the NIC 107 of the computer 110. The NIC 107 of the computer 106 depacketizes the encoded data and the decoder of the computer 106 decodes the encoded data to output the perspective view data. The perspective view data is sent via the wired or wireless connection from the computer 106 to the HMD for display on the display device of the HMD.

In one embodiment, the NIC 408 sends the packets having the encoded data via the computer network 110 to the NIC of the HMD. The NIC of the HMD depacketizes the encoded data and the decoder of the HMD decodes the encoded data to output the perspective view data for display on the display device of the HMD.

In one embodiment, instead of the head movement, another body part, e.g., a finger, one or more fingers, etc., of the user is moved and captured by the camera 108 or by the camera of the HMD to change the perspective of the virtual item 502A.

Figure 6B:
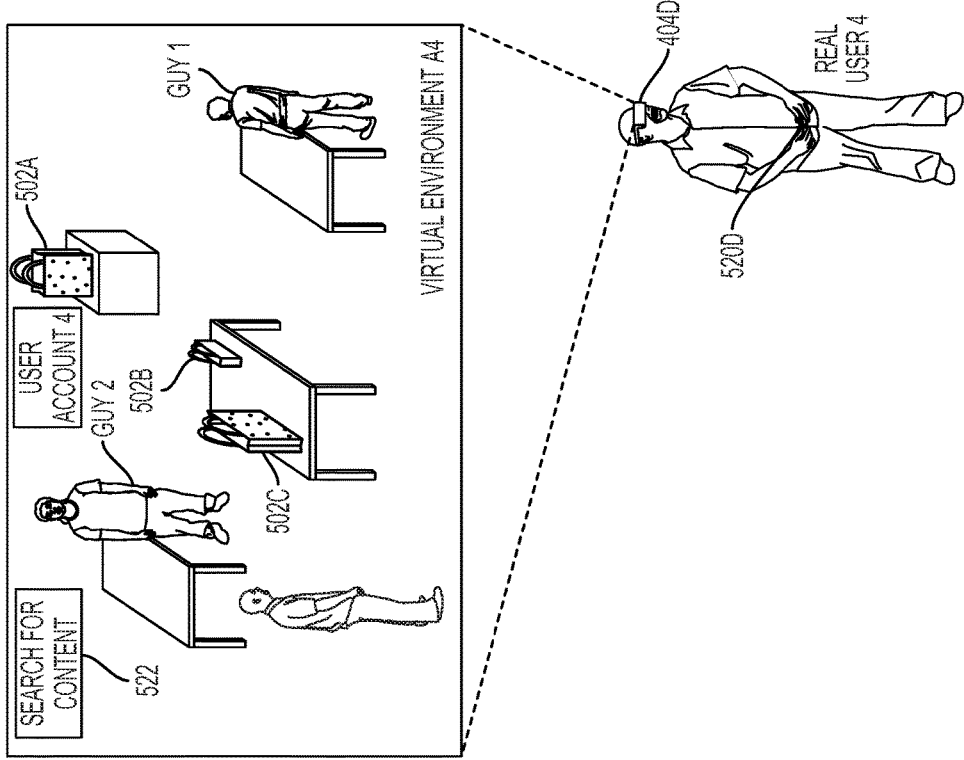
FIG. 6B is a diagram of an embodiment of a virtual environment to illustrate restriction from access to virtual items by a user whose user account is restricted.
Figure 6A:
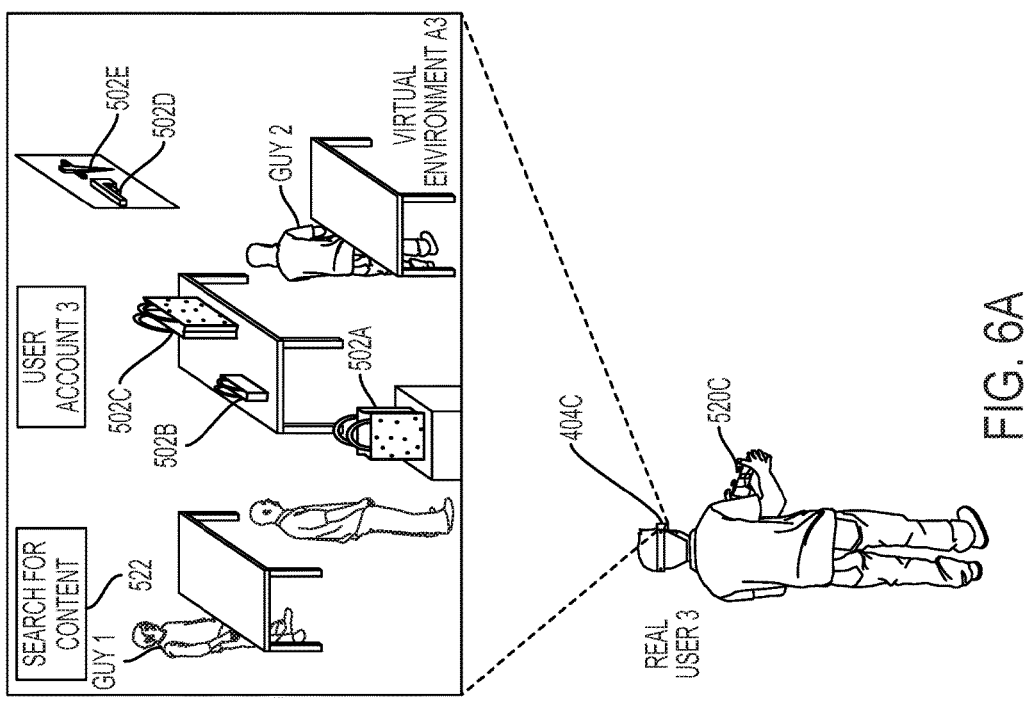
FIG. 6A is a diagram of an embodiment of a virtual environment to illustrate a placement of the virtual item in a location that is more prominent than locations of other virtual items within a virtual environment.

FIG. 6A is a diagram of an embodiment of a virtual environment A3 to illustrate a placement of the virtual item 502A in a location that is more prominent than locations of the virtual items 502B and 502C within a virtual environment A3. The processor 406 determines whether the rating 1 of the virtual item 502A exceeds a predetermined rating. For example, when a number of comments made by one or more users via his/her user accounts on the virtual item 502A exceeds a number of comments made by one or more users via his/her user account on another virtual item, e.g., the virtual item 502B, or 502C, or 502D, or 502E, by a pre-set amount, the rating 1 of the virtual item 502A exceeds the pre-determined rating and the ratings of the other virtual item is below the pre-determined rating. As another example, when a number of positive comments made by one or more users via his/her user accounts on the virtual item 502A exceeds a number of positive comments made by one or more users via his/her user account on another virtual item by a pre-set limit, the rating 1 of the virtual item 502A exceeds the pre-determined rating and the ratings of the other virtual item is below the pre-determined rating. An example of a positive comment on a virtual item is a comment that further promotes a virtual item or that praises the virtual item or that provides a high grade to the virtual item or a combination thereof. As another example, when a number of negative comments made by one or more users via his/her user accounts on the virtual item 502A is less than a number of negative comments made by one or more users via his/her user account on another virtual item by a pre-set number, the rating 1 of the virtual item 502A exceeds the pre-determined rating and the ratings of the other virtual item is below the pre-determined rating. An example of a negative comment on a virtual item is a comment that demotes a virtual item or that degrades the virtual item or that provides a low grade to the virtual item or a combination thereof. It should be noted that a comment made on a virtual item includes data regarding availability of the virtual item, or a quality of the virtual item, or a look of the virtual item, or a design of the virtual item, or a combination thereof.

Moreover, the processor 406 determines whether the user 3 logs into his/her user account 3 to access the virtual store represented by the virtual environments A1 and A2. For example, the user 3 makes a gesture or selects, via a hand-held controller 520C, an identifier of the virtual store displayed on the HMD 404C to indicate to the processor 406 that the user 3 desires to access the virtual store. Upon determining that the user 3 desires to access the virtual store, the processor 406 sends, via the computer network 110, virtual environment data to display the virtual environment A3 for display of the virtual item 502A on the HMD 404C in a more prominent manner, e.g., in front of the virtual store, in a larger format, in a larger size, in a highlighted format, in a bolded format, etc., compared to a manner in which other virtual items 502B and 502C are displayed within the virtual environment A3. In this manner, the virtual item 502A is pushed to the user account of the user 3 by being displayed in the more prominent location.

In one embodiment, a virtual item is presented in the prominent manner to a user who satisfies the demographic threshold in addition to meeting or exceeding the predetermined rating.

FIG. 6B is a diagram of an embodiment of a virtual environment A4 to illustrate restriction from access to the virtual items 502D and 502E by the user 4 whose user account 4 is restricted. The user 4 logs into his/her user account 4 and makes a selection, either via a gesture or a hand-held controller 520D, of the identifier of the virtual store to access the virtual environment A4 of the virtual store. An indication of the selection is sent from the HMD 404D via the computer 106, the computer network 110, and the NIC 408 to the processor 406. In one embodiment, the indication of the selection is sent from the HMD 404D via the computer network 110 and the NIC 408 to the processor 406 without using the computer 106.

Upon determining that the user 4 desires to access the virtual store, the processor 406 determines based on the permission set 4 whether the user account 4 is restricted from accessing the virtual items 502D and 502E. Upon determining that the user account 4 is restricted, the processor 406 sends via the encoder of the server 402, the NIC 408, and the computer network 110, virtual environment data that excludes virtual item data for display of the virtual environment A4 on the HMD 404D as lacking the virtual items 502D and 502E. For example, the encoder of the server 402 encodes the virtual environment data excluding the virtual item data to generate encoded virtual environment data and sends the encoded virtual environment data to the NIC 408. The NIC 408 packetizes the encoded virtual environment data and sends the packets via the computer network 110 to the computer 106. The NIC 107 of the computer 106 depacketizes the packets to extract the encoded virtual environment data and the decoder of the computer 106 decodes the encoded virtual environment data to output the virtual environment data. The virtual environment data is sent from the computer 106 to the HMD 404D via a wired or wireless connection to display the virtual environment A4 on the display device of the HMD 404D. The virtual environment A4 excludes the virtual items 502D and 502E.

In one embodiment, the virtual environment data excluding the virtual items 502D and 502E is sent to the HMD 404D. A NIC of the HMD 404D depacketizes the packets to extract the encoded virtual environment data and a decoder of the HMD 404D decodes the encoded virtual environment data to output the virtual environment data to display the virtual environment A4 on the display device of the HMD 404D.

In various embodiments, instead of excluding the virtual item data for the virtual items 502D and 502E, the processor 406 determines to hide or cover the virtual items 502D and 502E within the virtual environment A4.

It should be noted that the virtual environments A1 through A4 represent the same virtual store, e.g., store owned by the same entity, e.g., online retailer, etc., or that has the same lessee, etc. For example, each of the virtual environments A1 through A4 is a view of the virtual store from different standpoints, e.g., left, right, back, front, etc. In various embodiments, instead of the different standpoints, the same standpoint is used to represent the virtual store on the HMDs 404A through 404D.

Figure 7B:
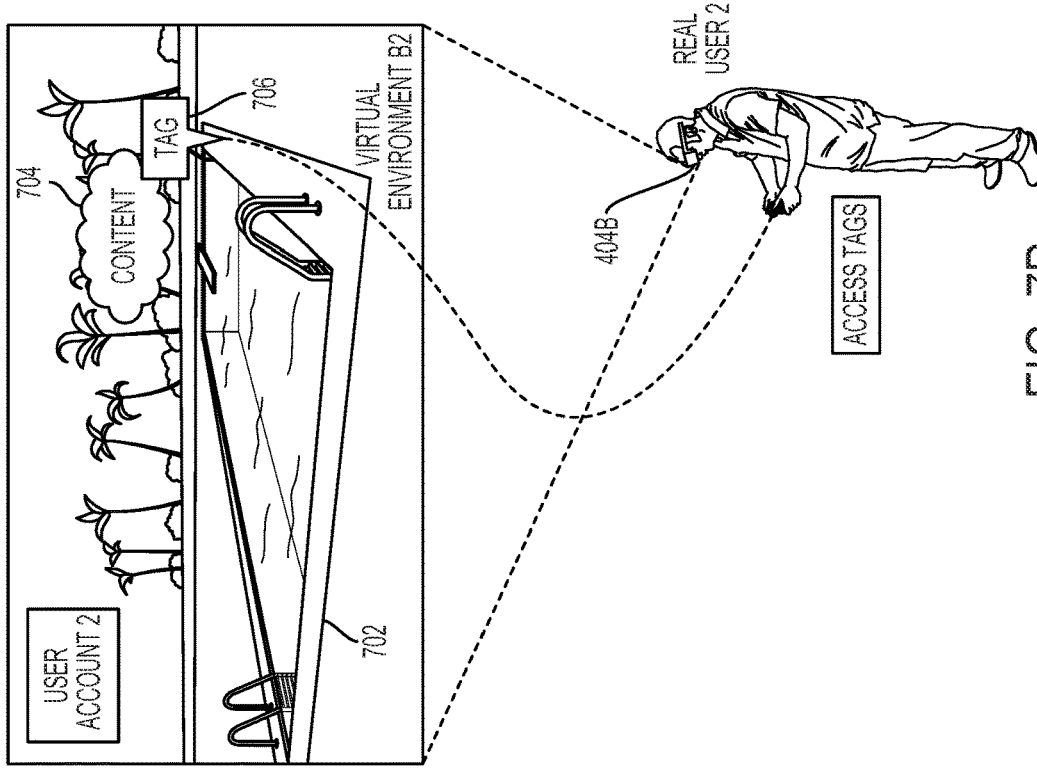
FIG. 7B is a diagram of an embodiment of a virtual environment that is displayed on an HMD to illustrate presentation of content when a user selects a tag or a virtual item.
Figure 7A:
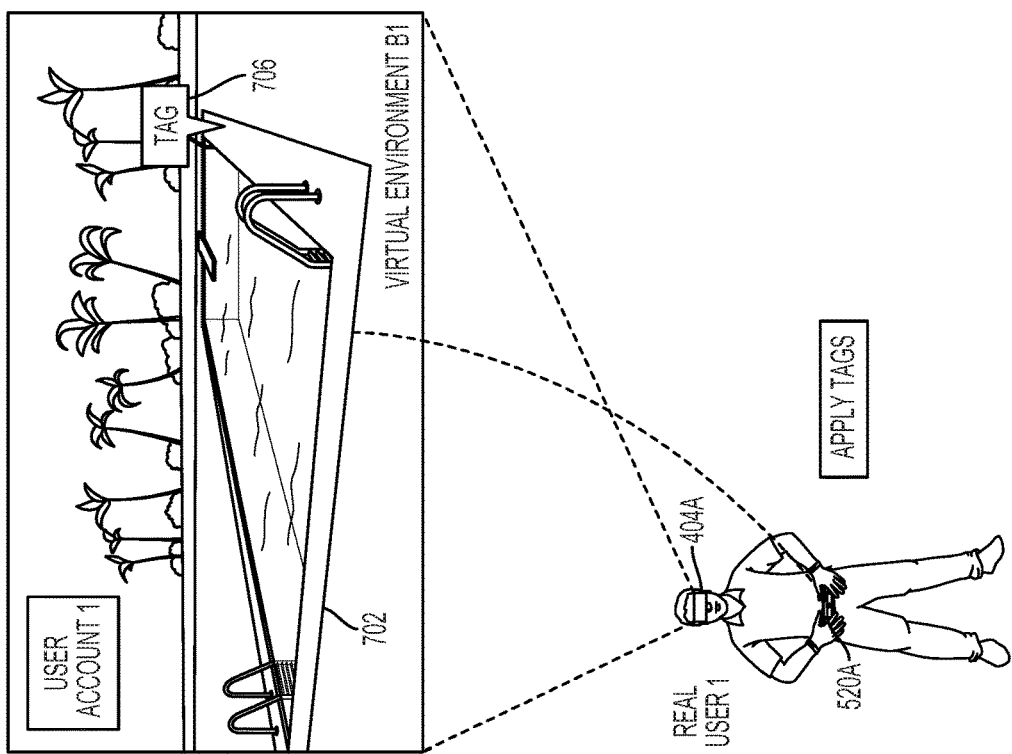
FIG. 7A is a diagram of a virtual environment that is displayed on an HMD to illustrate generation of a tag.

FIG. 7A is a diagram of a virtual environment B1 that is displayed on the HMD 404A. The virtual environment B1 has a virtual item 702, e.g., a virtual swimming pool, etc. of a facility, e.g., a hotel, a lodge, a motel, etc. The virtual item 702 is tagged in a manner similar to which the virtual item 502A (FIG. 5A) is tagged. For example, the virtual item 702 is tagged with a tag 706 when the virtual item 702 is associated with content 704, such as, a comment, e.g., "the pool is gorgeous", "watch out, the pool is dangerous", etc., which is positive or negative. The content 704 associated with the virtual item 702 is provided by the user 1.

FIG. 7B is a diagram of an embodiment of a virtual environment B2 that is displayed on the HMD 404B. When the user 2 selects the tag 706 or the virtual item 702, the content 704 associated with the tag 706 or the virtual item 702 is displayed on the HMD 404B.

Figure 8:
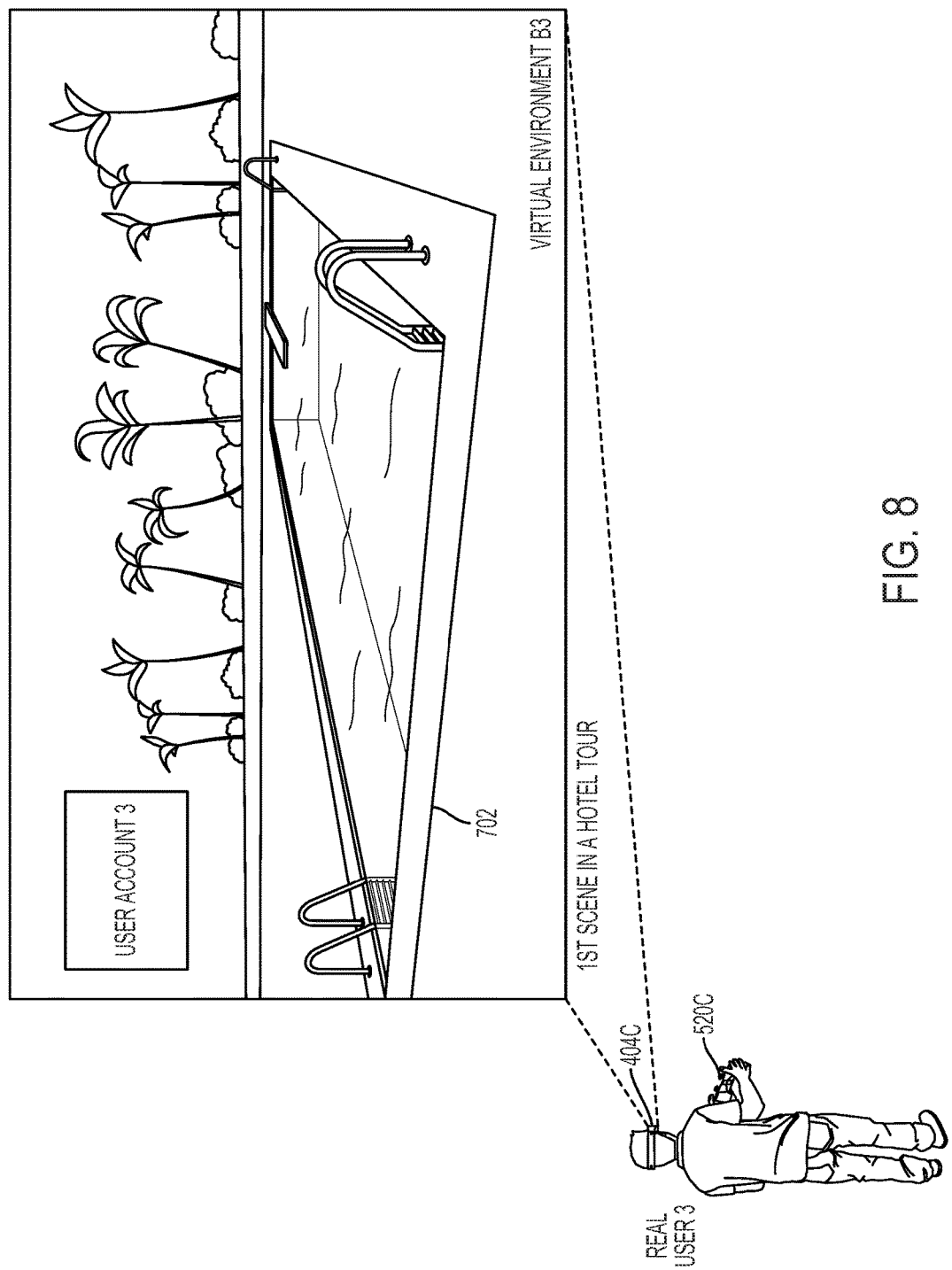
FIG. 8 is a diagram of an embodiment of a virtual environment that is displayed on an HMD to illustrate a display of a virtual item in a prominent manner.

FIG. 8 is a diagram of an embodiment of a virtual environment B3 that is displayed on the HMD 404C to illustrate a display of the virtual item 702 in the prominent manner. For example, during a virtual tour of the facility, the processor 406 displays the virtual item 702 first compared to other virtual locations of the facility. For example, a pool area of the facility is displayed first compared to a lobby of the hotel and a room of the hotel. When the user 3 makes a gesture or uses the hand-held controller 520C to access a website of the hotel from the processor 406 via the computer network 110 and the NIC 408, the website includes the pool area. The website includes buttons that the user 3 selects to visit other areas, such as the lobby and the room of the hotel. As another illustration, when the user 3 makes a gesture or uses the hand-held controller 520C to access a website of the hotel from the processor 406 via the computer network 110 and the NIC 408, the website runs a slide show to display the pool area first before displaying the lobby and the hotel. The virtual item 702 has a higher rating compared to other virtual items of the facility.

It should be noted that the virtual environments B1, B2, and B3 are views from the same standpoint of the virtual item 702.

In some embodiments, a virtual item is an item displayed using virtual reality. For example, the virtual item 702 is a computer-generated representation of a real pool.

In one embodiment, educational content, e.g., videos, videos of how to fix cars, videos taken during a classroom lecture, etc., is tagged by using the methods described herein. For example, an augmented reality scene is displayed on HMDs of students. Various items, e.g., a DNA sequence, a mathematical formula, a chemical equation, etc., drawn on a real classroom board in a real classroom environment are tagged when content is associated with the various items. The content is received from the students sitting in the classroom. The students are examples of the users 1 through 4.

As another example, various parts of a car engine are tagged to associate the parts with content that is provided by two mechanics, such as the users 1 and 2. The two mechanics wear HMDs to provide content, e.g., "this is how you change oil", "this is an air filter", etc., to tag various parts of the car and a real-time video of the various parts is displayed on the HMDs.

Figure 9:
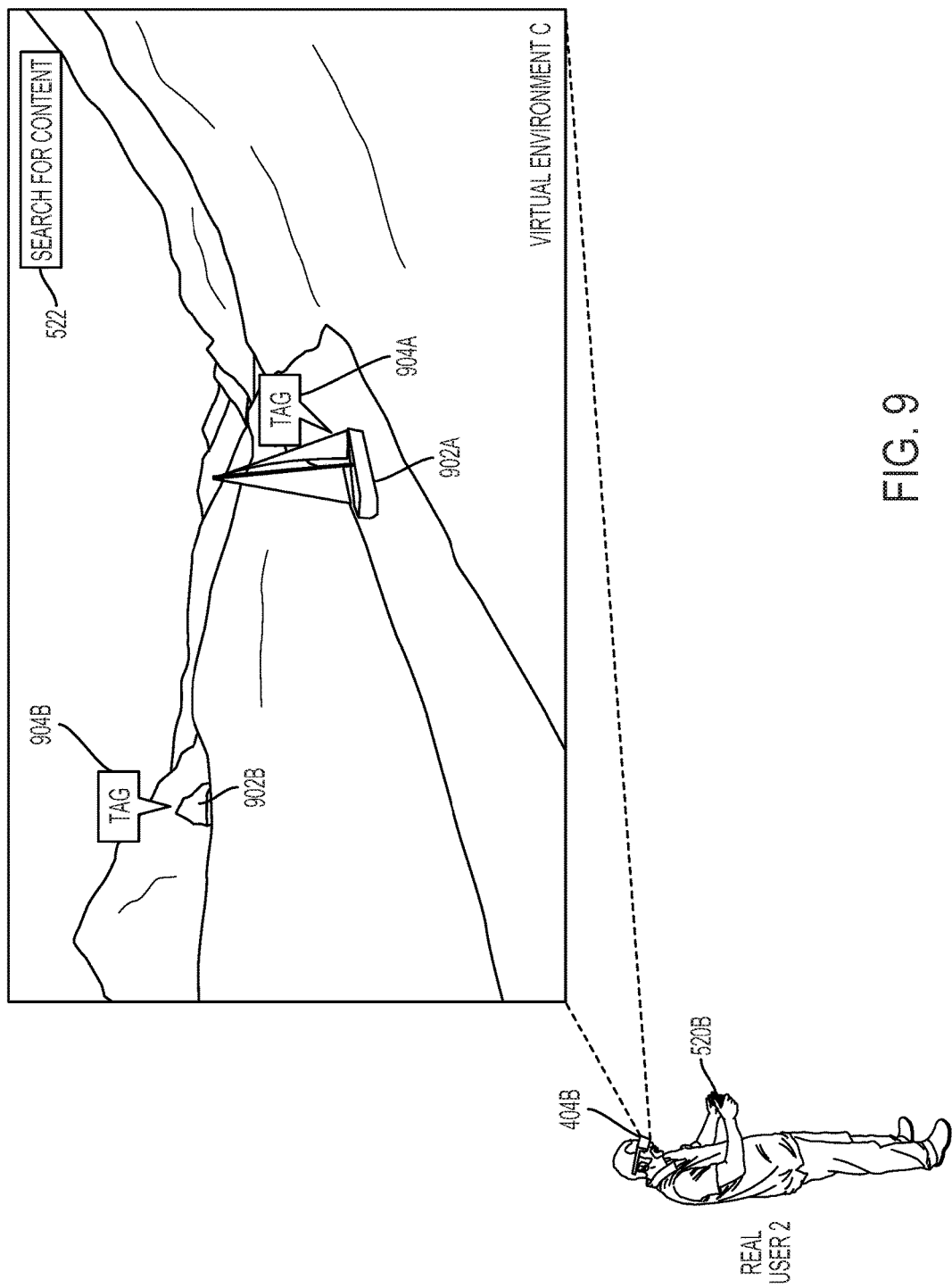
FIG. 9 is a diagram of an embodiment of a virtual environment that is displayed on an HMD to illustrate use of tags during play of a game.

FIG. 9 is a diagram of an embodiment of a virtual environment C that is displayed on the HMD 404B. The virtual environment C is displayed on the HMD 404B when a game code is executed by the processor 406 to allow the user 2 to play a game. The virtual environment C displays various virtual items, e.g., a virtual boat 902A, a virtual cave 902B, etc., that are tagged in a manner similar to which the virtual item 502A (FIG. 5A) is associated with a tag. The user 2 navigates the virtual environment C during the play of the game and selects a tag 904A via the hand-held controller 520B and/or by making a gesture. The tag 904A is associated with the virtual item 902A. Upon receiving an indication of the selection of the tag 904A, the processor 406 (FIG. 4A) sends content data to display content, e.g., clue, etc., associated with the tag 904A and the virtual item 902A. The content associated with the tag 904A provides a clue to the user 2 to unlock another level in the game or provides a clue to the the user 2 to gather more points in the game or a combination thereof. Similarly, a tag 904B when selected by the user 2 allows the user 2 to view content associated with the virtual item 902B. The content associated with the virtual item 902B and the tag 904B provides a clue to the user 2 to unlock another level in the game or provides a clue to the user 2 to gather more points in the game or a combination thereof.

It should be noted that content associated with a tag displayed within the game is created by another user, such as the user 1, while the user 1 is playing the game. For example, the user 1 makes a gesture or uses the hand-held controller 520A to access the game from the processor 406 via the computer network 110 and the NIC 408. The user 1 provides an input to the hand-held controller 520A or makes a gesture to provide the content associated with the virtual item 902A to create the tag 904A.

In one embodiment, one or more of the virtual environments described herein includes a search field, which is selected by a user by performing a gesture or by selecting a button on a hand-held controller, to search for content associated with tags. For example, during the play of the game, a user performs a gesture and/or uses the hand-held controller and/or provides an audio input to provide one or more alphanumeric characters in the search field. Upon receiving the alphanumeric characters from an HMD via the computer network 110 or via the computer 106 and the computer network 110, the processor 406 searches for content that matches a portion of or all of the alphanumeric characters and provides tags and/or the content for display on an HMD worn by the user. In an embodiment, once a user is at a game state, e.g., a scene, a point level, etc. in the game, the user searches for tags.

In an embodiment, the tags and/or content associated with the tags appears based on a gesture performed by a user. For example, when the user stares at a particular virtual item in a virtual scene, the processor 406 determines that the user is staring, e.g., looking at the virtual item for greater than a pre-determined amount of time, etc., or is making a gesture to move closer to the virtual item, and determines to display content and/or tags associated with the virtual item within a user account of the user on an HMD worn by the user. To further illustrate, the gaze tracking camera 312 (FIG. 3) detects the gaze of the user 1 at the virtual item. The gaze tracking camera 312 captures images of the gaze and communicates the images as motion input 318 via the computer network 110 and the NIC 408 (FIG. 4A) or via the computer 106 and the computer network 110 and the NIC 408 to the game engine 320, which is being executed by the processor 406. The processor 406 determines whether the images indicate that the user is gazing at the virtual item. Upon determining that the user is gazing at the virtual item, the processor 406 determines to display content and/or tags associated with the virtual item.

In one embodiment, the processor 406 generates a slider that is displayed on an HMD. A user wearing the HMD makes a gesture and/or uses a hand-held controller to change a position of a bar on the slider to provide an indication to the processor 406 of a number of tags to be presented in a virtual environment. Various positions of the bar on the slider indicate whether to present tags associated with content received from social network friends of the user via a social network, or from everyone, or no one, or people of the same demographic as that of the user, etc. In various embodiments, the processor 406 provides options on the HMD to present tags associated with content received from social network friends, or from everyone, or no one, or people of the same demographic as that of the user, etc.

Figure 10:
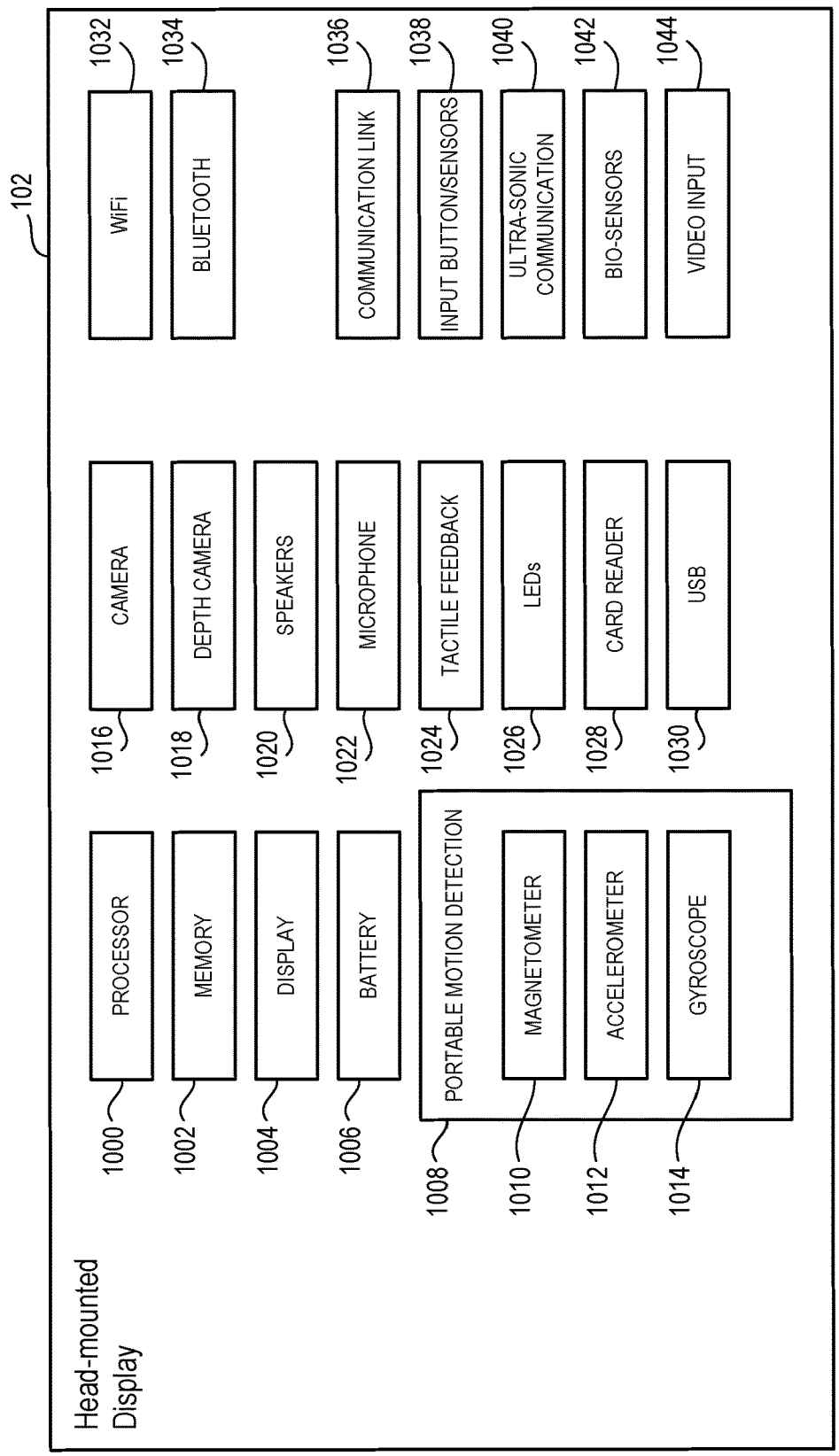
FIG. 10 illustrates components of a head-mounted display, in accordance with an embodiment of the disclosure.

With reference to FIG. 10, a diagram illustrating components of the HMD 102 is shown, in accordance with an embodiment of the disclosure. The HMD 102 includes a processor 1000 for executing program instructions. A memory device 1002 is provided for storage purposes, and may include both volatile and non-volatile memory. A display device 1004 is included which provides a visual interface that a user may view. A battery 1006 is provided as a power source for the HMD 102. A motion detection module 1008 includes any of various kinds of motion sensitive hardware, such as a magnetometer 1010, an accelerometer 1012, and a gyroscope 1014.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1012 are used to provide the direction of gravity, which gives an absolute reference for two angles (world-space pitch and world-space roll).

A magnetometer measures the strength and direction of the magnetic field in the vicinity of the HMD 102. In one embodiment, three magnetometers 1010 are used within the HMD 102, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field is warped due to metal in the environment, which causes a warp in the yaw measurement. If necessary, this warp is calibrated using information from other sensors such as the gyroscope or the camera. In one embodiment, accelerometer 1012 is used together with magnetometer 1010 to obtain the inclination and azimuth of the HMD 102.

In some implementations, the magnetometers of the HMD 102 are read during times when electromagnets in other nearby devices are inactive.

A gyroscope is a device for measuring or maintaining orientation, based on the principles of angular momentum. In one embodiment, three gyroscopes 1014 provide information about movement across the respective axis (x, y and z) based on inertial sensing. The gyroscopes help in detecting fast rotations. However, the gyroscopes can drift overtime without the existence of an absolute reference. The gyroscopes are reset periodically, and the resetting done using other available information, such as positional/orientation determination based on visual tracking of an object, accelerometer, magnetometer, etc.

A camera 1016 is provided for capturing images and image streams of the real-world interactive environment. More than one camera is included in the HMD 102, including a camera that is rear-facing (directed away from a user when the user is viewing the display of the HMD 102), and a camera that is front-facing (directed towards the user when the user is viewing the display of the HMD 102). Additionally, in some embodiments, a depth camera 1018 is included in the HMD 102 for sensing depth information of objects in a real environment.

The HMD 102 includes speakers 1020 for providing audio output. Also, in some embodiments, a microphone 1022 is included for capturing audio from the real environment, including sounds from the ambient environment, speech made by the user, etc. The HMD 102 includes tactile feedback module 1024 for providing tactile feedback to the user. In one embodiment, the tactile feedback module 1024 is capable of causing movement and/or vibration of the HMD 102 so as to provide tactile feedback to the user.

LEDs 1026 are provided as visual indicators of statuses of the HMD 102. For example, an LED may indicate battery level, power on, etc. A card reader 1028 is provided to enable the HMD 102 to read and write information to and from a memory card. A USB interface 1030 is included as one example of an interface for enabling connection of peripheral devices, or connection to other devices, such as other portable devices, computers, etc. In various embodiments of the HMD 102, any of various kinds of interfaces may be included to enable greater connectivity of the HMD 102.

A WiFi module 1032 is included for enabling connection to the Internet or a local area network via wireless networking technologies. Also, the HMD 102 includes a Bluetooth module 1034 for enabling wireless connection to other devices. In some embodiments, a communications link 1036 is included for connection to other devices. In one embodiment, the communications link 1036 utilizes infrared transmission for wireless communication. In other embodiments, the communications link 1036 utilizes any of various wireless or wired transmission protocols for communication with other devices.

Input buttons/sensors 1038 are included to provide an input interface for the user. Any of various kinds of input interfaces are included, such as buttons, touchpad, joystick, trackball, etc. An ultra-sonic communication module 1040 may be included in HMD 102 for facilitating communication with other devices via ultra-sonic technologies.

Bio-sensors 1042 are included to enable detection of physiological data from a user. In one embodiment, the bio-sensors 1042 include one or more dry electrodes for detecting bio-electric signals of the user through the user's skin.

A video input 1044 receives a video signal from a primary processing computer (e.g. main game console) for rendering on the HMD 102. In some implementations, the video input is a high-definition multimedia input (HDMI) input.

The foregoing components of HMD 102 have been described as merely exemplary components that are included in HMD 102. In various embodiments of the disclosure, the HMD 102 includes or does not include some of the various aforementioned components. Embodiments of the HMD 102 additionally includes other components not presently described, but known in the art, for purposes of facilitating aspects of the present disclosure as herein described.

Figure 11:
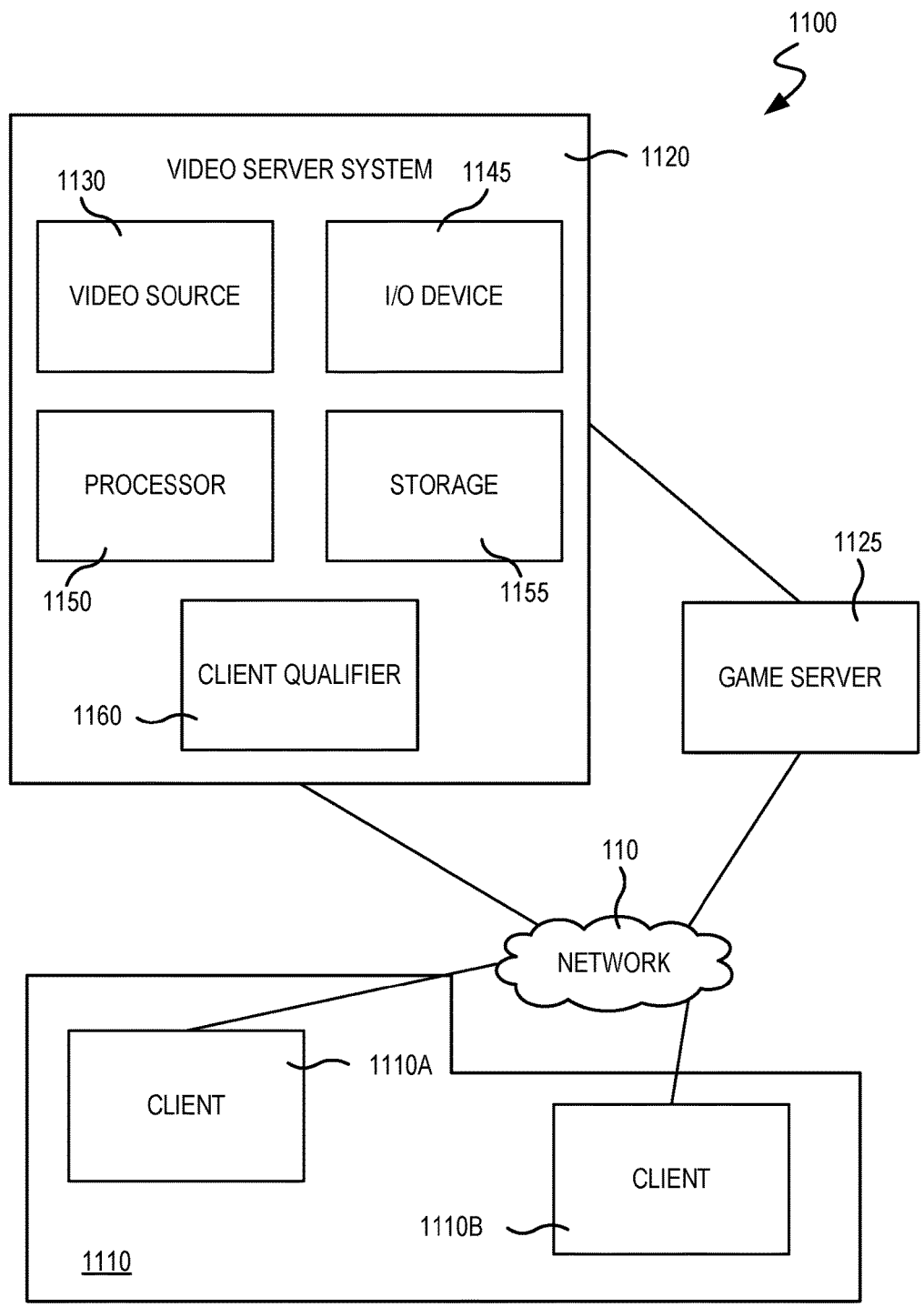
FIG. 11 is a block diagram of a game system, according to various embodiments of the disclosure.

FIG. 11 is a block diagram of a game system 1100, according to various embodiments of the disclosure. The game system 1100 provides a video stream to one or more clients 1110 via the computer network 110. The game system 1100 typically includes a video server system 1120 and an optional game server 1125. The server 402 (FIG. 4A) is a part of the server system 1120. In some embodiments, the game server 1125 is located within the video server system 1120 and the server 402 is a part of the video server system 1120. The video server system 1120 provides the video stream to the one or more clients 1110, e.g., HMDs described herein, the computer 106 (FIG. 1), etc., with a minimal quality of service. For example, the video server system 1120 receives a game command that changes the state of or a point of view within a video game, and provides the clients 1110 with an updated video stream reflecting this change in state with minimal lag time. The video server system 1120 provides the video stream in a wide variety of alternative video formats, including formats yet to be defined. Further, as an example, the video stream includes video frames for presentation to a user at a wide variety of frame rates. Typical frame rates are 30 frames per second, 60 frames per second, and 120 frames per second. Although higher or lower frame rates are included in alternative embodiments of the disclosure.

The clients 1110, referred to herein individually as 1110A, 1110B, etc., include head mounted displays, terminals, personal computers, game consoles, tablet computers, telephones, set top boxes, kiosks, wireless devices, digital pads, stand-alone devices, handheld game playing devices, and/or the like. Typically, the clients 1110 receive encoded video streams, decode the video streams, and present the resulting video to a user, e.g., a player of a game. The processes of receiving encoded video streams and/or decoding the video streams typically includes storing individual video frames in a receive buffer of the client 1110A or 1110B. The video streams are presented to a user on a display integral to the client 1110A or 1110B or on a separate device such as a monitor or television. The clients 1110 optionally support more than one game player. For example, a game console is configured to support two, three, four or more simultaneous players. Each of these players receive a separate video stream, or a single video stream includes regions of a frame generated specifically for each player, e.g., generated based on each player's point of view. The clients 1110 are optionally geographically dispersed. The number of clients 1110 included in game system 1100 varies widely from one or two to thousands, tens of thousands, or more. As used herein, the term "game player" is used to refer to a person that plays a game and the term "game playing device" is used to refer to a device used to play a game. In some embodiments, the game playing device refers to a plurality of computing devices that cooperate to deliver a game experience to the user. For example, a game console and an HMD cooperate with the video server system 1120 to deliver a game viewed through the HMD. In one embodiment, the game console receives the video stream from the video server system 1120, and the game console forwards the video stream, or updates to the video stream, to the HMD for rendering.

The clients 1110 receive video streams via the computer network 110. The computer network 110 is any type of communication network including the Internet, wireless networks, local area networks, wide area networks, private networks, and/or the like. In typical embodiments, the video streams are communicated via standard protocols, such as TCP/IP or User Datagram Protocol over IP (UDP/IP). Alternatively, the video streams are communicated via proprietary standards.

A typical example of clients 1110 is a personal computer including a processor, non-volatile memory, a display, decoding logic, network communication capabilities, and input devices. The decoding logic includes hardware, firmware, and/or software stored on a computer readable medium. Systems for decoding (and encoding) video streams vary depending on the particular encoding scheme used.

In some embodiments, the clients 1110 further include systems for modifying received video. For example, a client performs further rendering, to overlay one video image on another video image, to crop a video image, and/or the like. For example, clients 1110 receive various types of video frames, such as I-frames, P-frames and B-frames, and to process these frames into images for display to a user. In some embodiments, clients 1110 perform further rendering, shading, conversion to three-dimensional (3-D) images, or like operations on the video stream. The clients 1110 optionally receive more than one audio or video stream. Input devices of the clients 1110 include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by the clients 1110 is generated and provided by the video server system 1120. This video stream includes video frames (and the audio stream includes audio frames). The video frames contribute (e.g., they include pixel information in an appropriate data structure) meaningfully to the images displayed to the user. As used herein, the term "video frames" is used to refer to frames including predominantly information that contributes to, e.g. to effect, the images shown to the user. Most of the teachings herein with regard to "video frames" are also applied to "audio frames", in some embodiments.

The clients 1110 receive inputs from a user via one or more of the input devices. These inputs include game commands that change the state of the video game or otherwise affect game play. The game commands are received using the input devices and/or are automatically generated by computing instructions executing on clients 1110. The received game commands are communicated from the clients 1110 via the computer network 110 to the video server system 1120 and/or the game server 1125. For example, in some embodiments, the game commands are communicated to the game server 1125 via the video server system 1120. In some embodiments, separate copies of the game commands are communicated from the clients 1110 to the game server 1125 and the video server system 1120. The communication of game commands is optionally dependent on the identity of the command. Game commands are optionally communicated from the client 1110A through a different route or communication channel that that used to provide audio or video streams to the client 1110A.

The game server 1125 is optionally operated by a different entity than the video server system 1120. For example, the game server 1125 is operated by a publisher of a multiplayer game. In this example, the video server system 1120 is optionally viewed as a client by the game server 1125 and optionally configured to appear from the point of view of the game server 1125 to be a client executing a game engine. Communication between the video server system 1120 and the game server 1125 optionally occurs via the computer network 110. As such, the game server 1125 is a multiplayer game server that sends game state information to multiple clients, one of which is the video server system 1120. The video server system 1120 communicates with multiple instances of the game server 1125 at the same time. For example, the video server system 1120 provides a plurality of different video games to different users. Each of these different video games are supported by a different game server and/or published by different entities. In some embodiments, several geographically distributed instances of the video server system 1120 provide game video to a plurality of different users. Each of these instances of the video server system 1120 is in communication with the same instance of the game server 1125. Communication between the video server system 1120 and one or more game servers optionally occurs via a dedicated communication channel. For example, the video server system 1120 is connected to the game server 1125 via a high bandwidth channel that is dedicated to communication between these two systems.

The video server system 1120 includes at least a video source 1130, an input/output (I/O) device 1145, a processor 1150, and non-transitory storage 1155. The video server system 1120 includes one computing device or be distributed among a plurality of computing devices. These computing devices are optionally connected via a communications system such as a local area network.

The video source 1130 provides a video stream, e.g., streaming video or a series of video frames that form a moving picture. In some embodiments, the video source 1130 includes a video game engine and rendering logic. The video game engine receives game commands from a player and to maintain a copy of the state of the video game based on the received commands. This game state includes the position of objects in a game environment, as well as typically a point of view. The game state includes, in some embodiments, properties, images, colors and/or textures of objects. The game state is typically maintained based on game rules, as well as game commands such as move, turn, attack, set focus to, interact, use, and/or the like. Part of the game engine is optionally disposed within the game server 1125. The game server 1125 maintains, in various embodiments, a copy of the state of the game based on game commands received from multiple players using geographically disperse clients. In these cases, the game state is provided by the game server 1125 to the video source 1130, where a copy of the game state is stored and rendering is performed. The game server 1125 receives game commands directly from the clients 1110 via the computer network 110.

The video source 1130 includes rendering logic, e.g., hardware, firmware, and/or software stored on a computer readable medium such as a storage 1155. This rendering logic creates video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to the clients 1110. For example, the raw video is encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream includes, in some embodiments, different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In an embodiment, the video source 1130 includes a video recording device such as a camera. This camera is used to generate delayed or live video that can be included in the video stream of a computer game. The resulting video stream, optionally includes both rendered images and images recorded using a still or video camera. The video source 1130 also includes, in some embodiments, storage devices configured to store previously recorded video to be included in a video stream. The video source 1130 includes, in various embodiments, motion or positioning sensing devices configured to detect motion or position of an object, e.g., person, and logic configured to determine a game state or produce video-based on the detected motion and/or position.

The video source 1130 optionally provides overlays to be placed on other video. For example, these overlays include a command interface, log in instructions, messages to a game player, images of other game players, video feeds of other game players (e.g., webcam video). In embodiments of client 1110A including a touch screen interface or a gaze detection interface, the overlay may include a virtual keyboard, joystick, touch pad, and/or the like. In one example of an overlay a player's voice is overlaid on an audio stream. The video source 1130 optionally further includes one or more audio sources.

In embodiments in which the video server system 1120 maintains the game state based on input from more than one player, each player have a different point of view including a position and direction of view. The video source 1130 optionally provides a separate video stream for each player based on their point of view. Further, the video source 1130 optionally provides a different frame size, frame data size, and/or encoding to each of the clients 1110. The video source 1130 optionally provides 3-D video.

I/O Device 1145 for the video server system 1120 sends and/or receives information such as video, commands, requests for information, a game state, gaze information, device motion, device location, user motion, client identities, player identities, game commands, security information, audio, and/or the like. I/O Device 1145 includes communication hardware such as a network card or modem. I/O Device 1145 communicates with the game server 1125, the computer network 110, and/or the clients 1110.

The processor 1150 executes logic, e.g. software, included within the various components of the video server system 1120 discussed herein. For example, processor 1150 is programmed with software instructions in order to perform the functions of the video source 1130, game server 1125, and/or a client qualifier 1160. The video server system 1120 optionally includes more than one instance of the processor 1150. The processor 1150 may also be programmed with software instructions in order to execute commands received by the video server system 1120, or to coordinate the operation of the various elements of the game system 1100 discussed herein. The processor 1150 includes one or more hardware devices. The processor 1150 is an electronic processor.

Storage 1155 includes non-transitory analog and/or digital storage devices. For example, storage 1155 includes an analog storage device configured to store video frames. Storage 1155 may include a computer readable digital storage, e.g. a hard drive, an optical drive, or solid state storage. Storage 1115 stores (e.g. by way of an appropriate data structure or file system) video frames, artificial frames, a video stream including both video frames and artificial frames, audio frame, an audio stream, and/or the like. Storage 1155 is optionally distributed among a plurality of devices. In some embodiments, storage 1155 stores the software components of the video source 1130 discussed elsewhere herein. These components are stored in a format ready to be provisioned when needed.

The video server system 1120 optionally further includes a client qualifier 1160. Client qualifier 1160 remotely determines the capabilities of a client, such as client 1110A or 1110B. These capabilities include both the capabilities of the client 1110A itself as well as the capabilities of one or more communication channels between the client 1110A and the video server system 1120. For example, the client qualifier 1160 tests a communication channel through the computer network 110.

The client qualifier 1160 determines (e.g., discover) the capabilities of the client 1110A manually or automatically. Manual determination includes communicating with a user of the client 1110A and asking the user to provide capabilities. For example, in some embodiments, the client qualifier 1160 displays images, text, and/or the like within a browser of the client 1110A. In one embodiment, the client 1110A is an HMD that includes a browser. In another embodiment, client 1110A is a game console having a browser, which may be displayed on the HMD. The displayed objects request that the user enter information such as operating system, processor, video decoder type, type of network connection, display resolution, etc. of the client 1110A. The information entered by the user is communicated back to the client qualifier 1160.

Automatic determination occurs, for example, by execution of an agent on the client 1110A and/or by sending test video to the client 1110A. The agent includes computing instructions, such as java script, embedded in a web page or installed as an add-on. The agent is optionally provided by the client qualifier 1160. In various embodiments, the agent finds out processing power of the client 1110A, decoding and display capabilities of the client 1110A, lag time reliability and bandwidth of communication channels between the client 1110A and the video server system 1120, a display type of the client 1110A, firewalls present on the client 1110A, hardware of the client 1110A, software executing on the client 1110A, registry entries within the client 1110A, and/or the like.

The client qualifier 1160 includes hardware, firmware, and/or software stored on a computer readable medium. The client qualifier 1160 is optionally disposed on a computing device separate from one or more other elements of the video server system 1120. For example, in some embodiments, the client qualifier 1160 determines the characteristics of communication channels between the clients 1110 and more than one instance of the video server system 1120. In these embodiments the information discovered by Client Qualifier is used to determine which instance of the video server system 1120 is best suited for delivery of streaming video to one of the clients 1110.

In some embodiments, a classifier of real world objects is used to detect and identify objects from the above mentioned cameras. These classifiers, allow for the fast identification of real world objects by containing or being connected via internet to a database of computer recognizable objects. For example, the classifier is able to identify individual objects such as a coffee table or lamp situated within the virtual reality interactive space. As a further example, the classifier is able to identify a floor and a wall and the points at which the two meet.

In various embodiments, an HMD includes cameras on a front face of the HMD and on a band that is worn on a back side of a user's head. The cameras on the back side face an real-world environment in which the user performs a gesture to protect the user from accidentally hitting an object behind the user.

Embodiments described in the present disclosure may be practiced with various computer system configurations including hand-held devices, microprocessor systems, microprocessor-based or programmable consumer electronics, minicomputers, mainframe computers and the like. The embodiments described in the present disclosure can also be practiced in distributed computing environments where tasks are performed by remote processing devices that are linked through a wire-based or wireless network.

With the above embodiments in mind, it should be understood that the embodiments described in the present disclosure can employ various computer-implemented operations involving data stored in computer systems. These operations are those requiring physical manipulation of physical quantities. Any of the operations described herein that form part of the embodiments described in the present disclosure are useful machine operations. Some embodiments described in the present disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Some embodiments described in the present disclosure can also be embodied as computer readable code on a computer readable medium. The computer readable medium is any data storage device that can store data, which can be thereafter be read by a computer system. Examples of the computer readable medium include a hard drive, a NAS, a ROM, a RAM, a CD-ROM, a CD-R, a CD-RW, a magnetic tape, an optical data storage device, a non-optical data storage device, etc. The computer readable medium can include computer readable tangible medium distributed over a network-coupled computer system so that the computer readable code is stored and executed in a distributed fashion.

It should be noted that in some embodiments, any of the embodiments described herein are combined with any of the remaining embodiments.

Moreover, although some of the above-described embodiments are described with respect to a gaming environment, in some embodiments, instead of a game, other environments, e.g., a video conferencing environment, etc., is used.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments described in the present disclosure have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method comprising:
sending, via a computer network, virtual environment data for display of a shared virtual environment on a first head-mounted display, wherein the first head-mounted display is configured to be worn by a first user, wherein the shared virtual environment includes a three-dimensional view of a virtual item;
receiving, via the computer network and a first user account of the first user, an indication of a selection associated with the virtual item;
sending, via the computer network, option data for allowing entry of content regarding the virtual item upon receiving the indication of the selection;
receiving, via the computer network, the content;
associating the content with the virtual item and the first user account;
sending, via the computer network, tagged data for displaying a tag associated with the virtual item, wherein the tag indicates that the content is associated with the virtual item;
analyzing a number of interactions with the virtual item including the selection of the virtual item to determine a rating for the virtual item, wherein the interactions include three-dimensional movement of the virtual item in the shared virtual environment;
sending, via the computer network, data for display of the virtual item within the shared virtual environment to a second head-mounted display based on the rating and an interest profile associated with a second user account of a second user.

2. The method of claim 1, wherein said associating the content with the virtual item and the first user account includes generating an entry in a database for storing data regarding the virtual item and providing a link between the data regarding the virtual item and a user identifier of the first user account, the link further related to an entry that includes an identifier of the content.

3. The method of claim 2, wherein the database is accessible to a plurality of other user accounts to enable an access to the virtual item and retrieval of the content.

4. The method of claim 2, wherein the database links the first user account and the content to a model of the virtual item that enables the three-dimensional view of the virtual item in the first virtual environment, wherein the first virtual environment is a virtual online store.

5. The method of claim 4, wherein the model has graphics data associated with geometry, shape, shading, and texture of the virtual item.

6. The method of claim 5, wherein the texture is defined by lighting, a number of polygonal pieces forming the virtual item, and color.

7. The method of claim 1, wherein the virtual item is viewable at different perspectives based on gestures made by the first user.

8. The method of claim 1, wherein the virtual item is displayed at different perspectives based on an orientation of the first head-mounted display, wherein the different perspectives are displayed when the first head-mounted display is moved by the first user.

9. The method of claim 1, wherein the content is audio content, or video content, or text, or graphics, or a combination thereof, wherein the content is associated with an identity of the first user account accessed to create the content.

10. The method of claim 1, further comprising:
receiving, via the computer network and the second user account, a search request to search for the virtual item, wherein the second user account is assigned to the second user;
determining whether the second user account has permission to access the virtual item and the content in response to the search request; and
sending, via the computer network, the content for display within the shared virtual environment on the second head-mounted display configured to be worn by the second user, wherein said sending the data for display of the virtual item and said sending the content for display within the shared virtual environment are performed upon determining that the second user account has permission to access the virtual item and the content.

11. The method of claim 1, further comprising:
sending, via the computer network, the virtual environment data for display of the shared virtual environment on the second head-mounted display configured to be worn by the second user, wherein the shared virtual environment includes the tag;
receiving, via the computer network and the second user account of the second user, an indication of a selection of the tag;
determining whether the second user account has permission to access the content upon receiving the indication of the selection of the tag; and
sending, via the computer network and the second user account, content data for displaying the content via the second user account upon determining that the second user account has the permission.

12. The method of claim 11, wherein the first user account is not accessed via the computer network to display the shared virtual environment on the first head-mounted display when the second user account is used to access the shared virtual environment on the second head-mounted display.

13. The method of claim 1, further comprising:
sending, via the computer network, the virtual environment data for display of the shared virtual environment on the second head-mounted display configured to be worn by the second user;
receiving, via the computer network and the second user account of the second user, an indication of a selection of the virtual item;
determining whether the second user account has permission to access the content upon receiving the indication of the selection of the virtual item;
sending, via the computer network, content data for displaying the content via the second user account upon determining that the second user account has the permission.

14. The method of claim 1, further comprising:
determining whether the virtual item will be accessed via the second user account;
determining whether the rating exceeds a predetermined rating, wherein said sending the data for display of the virtual item includes sending; the data for display of the virtual item in a more prominent manner compared to a manner in which other virtual items are displayed within the shared virtual environment in response to determining that the virtual item will be accessed via the second user account.

15. The method of claim 1, further comprising:
sending, via the computer network, the virtual environment data for display of the shared virtual environment on the second head-mounted display, wherein the second head-mounted display is configured to be worn by the second user;
receiving, via the computer network and the second user account of the second user, an indication of a selection of the tag;
sending, via the computer network, option data for allowing entry of additional content regarding the virtual item upon receiving the indication of the selection of the tag;
receiving, via the computer network, the additional content;
associating the additional content with the virtual item and the tag.

16. The method of claim 1, further comprising:
sending, via the computer network, the virtual environment data for display of the shared virtual environment on the second head-mounted display, wherein the second head-mounted display is configured to be worn by the second user;
receiving, via the computer network and the second user account of the second user, an indication of a selection of the virtual item;
sending, via the computer network, option data for allowing entry of additional content regarding the virtual item upon receiving the indication of the selection of the virtual item;
receiving, via the computer network, the additional content;
associating the additional content with the virtual item and the tag.

17. The method of claim 1, further comprising:
counting an amount of content associated with the virtual item;
determining whether the amount of content exceeds a pre-determined threshold;

determining whether access to the virtual environment data for display of the shared virtual environment is requested from the second user account assigned to the second user;

sending, via the computer network, the virtual environment data for display of the shared virtual environment on the second head-mounted display configured to be worn by the second user upon determining that the access to the virtual environment for display of the shared virtual environment is requested from the second user account, wherein the shared virtual environment displays the virtual item in a more prominent location compared to a location of display of the virtual item in the shared virtual environment displayed on the first head-mounted display.

18. The method of claim 1, wherein the first virtual environment includes a virtual user using the virtual item.

19. The method of claim 1, wherein the virtual item is displayed at a first location within the shared virtual environment displayed on the first head-mounted display and at a second location within the shared virtual environment displayed on the second head-mounted display, wherein the second location is different from the first location.

20. A system comprising:
a first head-mounted display, wherein the first head-mounted display is configured to be worn by a first user; and
one or more servers coupled to the first head-mounted display via a computer network, wherein the one or more servers are configured to send, via the computer network, virtual environment data for display of a shared virtual environment on the first head-mounted display, wherein the shared virtual environment includes a three-dimensional view of a virtual item,
wherein the first head-mounted display is configured to display the shared virtual environment,
wherein the one or more servers are configured to receive, via the computer network and a first user account of the first user, an indication of a selection associated with the virtual item displayed on the first head-mounted display;
wherein the one or more servers are configured to send, via the computer network, option data for allowing entry of content regarding the virtual item upon receiving the indication of the selection,
wherein the first head-mounted display is configured to display the option data for the entry of the content,
wherein the one or more servers are configured to receive, via the computer network, the content;
wherein the one or more servers are configured to associate the content with the virtual item; and
wherein the one or more servers are configured to send, via the computer network, tagged data for displaying a tag associated with the virtual item, wherein the tag indicates that the content is associated with the virtual item,
wherein the first head-mounted display is configured to display the tag,
wherein the one or more servers are configured to analyze a number of interactions with the virtual item including the selection of the virtual item to determine a rating for the virtual item, wherein the interactions include three-dimensional movement of the virtual item in the shared virtual environment,
wherein the one or more servers are coupled to a second head-mounted display via the computer network, wherein the one or more servers are configured to send, via the computer network, data for display of the virtual item within the shared virtual environment to the second head-mounted display based on the rating and an interest profile associated with a second user account of a second user.

21. The system of claim 20, wherein the content is audio content, or video content, or text, or a combination thereof, wherein the content is associated with an identity of the first user account accessed to create the content.

22. The system of claim 20,
wherein the second head-mounted display is configured to be worn by the second user,
wherein the second head-mounted display is configured to display a field for receiving a search request for the virtual item via the second user account assigned to the second user,
wherein the one or more servers are configured to receive, via the computer network and the second user account, the search request to search for the virtual item,
wherein the one or more servers are configured to determine whether the second user account has permission to access the virtual item and the content in response to the search request,
wherein the one or more servers are configured to send, via the computer network, the virtual environment data for display of the shared virtual environment upon determining that the second user account has permission to access the virtual item and the content,
wherein the second head-mounted display is configured to display the shared virtual environment, wherein the shared virtual environment includes the content.

23. The system of claim 20,
wherein the second head-mounted display is configured to be worn by the second user,
wherein the one or more servers are configured to send, via the computer network, the virtual environment data for display of the shared virtual environment on the second head-mounted display, wherein the shared virtual environment includes the tag,
wherein the one or more servers are configured to receive, via the computer network and the second user account of the second user, an indication of a selection of the tag;
wherein the one or more servers are configured to determine whether the second user account has permission to access the content upon receiving the indication of the selection of the tag, and
wherein the one or more servers are configured to send, via the computer network, content data for displaying the content via the second user account upon determining that the second user account has the permission,
wherein the second head-mounted display is configured to display the content within the shared virtual environment.

24. The system of claim 23, wherein the first user account is not accessed via the computer network to display the shared virtual environment on the first head-mounted display when the second user account is used to access the shared virtual environment on the second head-mounted display.

25. A system comprising:
a first head-mounted display configured to display a shared virtual environment, wherein the first head-mounted display is configured to be worn by a first user, wherein the shared virtual environment includes a three-dimensional view of a virtual item; and a communication device coupled to the first head-mounted display for sending, via a computer network and a first user account of the first user, an indication of a selection associated with the virtual item, wherein the communication device is configured to receive, via the computer network, option data for allowing entry of content regarding the virtual item after the indication of the selection is sent, wherein the first head-mounted display is configured to display the content, wherein the communication device is configured to send the content via the computer network to a server for associating of the content with the virtual item, wherein the communication device is configured to receive tag data for displaying a tag associated with the virtual item, wherein the tag indicates that the content is associated with the virtual item, a second head-mounted display coupled to the computer network, wherein the second head-mounted display is configured to receive, via the computer network, data for display of the virtual item within the shared virtual environment based on a rating and an interest profile associated with a second user account associated with a second user, wherein the rating is determined from an analysis of a number of interactions with the virtual item including the selection of the virtual item, wherein the interactions include three-dimensional movement of the virtual item in the shared virtual environment.

26. The system of claim 25, wherein the content is audio content, or video content, or text, or a combination thereof.

* * * * *